United States Patent [19]
Rolchigo

[11] Patent Number: 5,143,630
[45] Date of Patent: Sep. 1, 1992

[54] ROTARY DISC FILTRATION DEVICE

[75] Inventor: Philip M. Rolchigo, Edison, N.J.

[73] Assignee: Membrex, Inc., Fairfield, N.J.

[21] Appl. No.: 708,069

[22] Filed: May 30, 1991

[51] Int. Cl.$^5$ .............................................. B01D 33/15
[52] U.S. Cl. .................................... 210/780; 210/330
[58] Field of Search ............... 210/332, 324, 330, 767, 210/780, 331

[56] References Cited

U.S. PATENT DOCUMENTS

| | | |
|---|---|---|
| 1,762,560 | 6/1930 | Morton . |
| 3,477,575 | 11/1969 | Nemec et al. . |
| 4,311,589 | 1/1982 | Brumfield . |
| 4,376,049 | 3/1983 | Valentine . |
| 4,592,848 | 6/1986 | Pabst . |
| 4,790,942 | 12/1988 | Shmidt et al. . |
| 4,906,379 | 3/1990 | Hodgins et al. . |
| 5,000,848 | 3/1991 | Hodgins et al. . |

FOREIGN PATENT DOCUMENTS

| | | |
|---|---|---|
| 258313 | 3/1967 | Austria . |
| 1057015 | 2/1967 | United Kingdom . |

OTHER PUBLICATIONS

Murkes and Carlsson, *Crossflow Filtration—Theory and Practice*, 133 pages, John Wiley & Sons, New York (1988).
Schweigler and Stahl, "High Performance Disc Filter for Dewatering Mineral Slurries," Filtration and Separation, Jan./Feb., pp. 38-41 (1990).
Parkinson, "Novel Separator Makes Its Debut," *Chemical Engineering* (Jan. 1989), 1-page reprint by Aqua Technology Resource Management, Inc.
Aqua Technology Resource Management, Inc., "How to Keep Your Fluid Processing Budget from Going to Waste," 3-page brochure.
Aqua Technology Resource Management, Inc., 4-page brochure (untitled) discussing "Technology Background," Overcoming Concentration Polarization, etc.
Ingersoll-Rand, "Upgrade your entire filtering and/or washing operation with the new Artisan Dynamic Thickener/Washer," Bulletin No. 4081, 4 pages (Feb. 1986).
Ingersoll-Rand, "Patented filter/wash capability permits simultaneous washing and filtering," Bulletin No. 4060, 4 pages (Aug. 1983).
Wronski, Molga, and Rudniak, "Dynamic Filtration in Biotechnology," *Bioprocess Engineering*, vol. 4, pp. 99-104 (1989).
Wronski and Mroz, "Power Consumption in Dynamic Disc Filters," *Filtration & Separation*, Nov./Dec., pp. 397-399 (1984).
Wronski, Rudniak, and Molga, "Resistance Model for High-Shear Dynamic Microfiltration," Filtration & Separation, Nov./Dec., pp. 418-420 (1989).
Rudniak and Wronski, "Dynamic Microfiltration in Biotechnology," *Proceedings 1st Event: Bioprocess Engineering*, Institute of Chemical and Process Engineering, Warsaw University of Technology, Warsaw, Poland, Jun. 26-30, 1989.

(List continued on next page.)

*Primary Examiner*—Frank Sever
*Attorney, Agent, or Firm*—Bryan Cave

[57] ABSTRACT

A rotary disc filtration device having a fluid filtration gap between a filtration surface and a disc is disclosed. The disc and/or filter has one or more spiral grooves in fluid communication with fluid in the gap. The disc and/or filter is rotated and one or both may be axially oscillated and/or vibrated to create the shear at the filter surface that increases permeate flux through the filter. Several discs and filters may be interleaved to increase filtration device capacity and make more efficient use of equipment space. In such a device, the discs can be mounted on a common shaft for rotation in unison and can have spiral grooves on both major faces of each disc. The filters are held stationary in that device and are fluidly connected to facilitate collection of the permeate.

81 Claims, 13 Drawing Sheets

OTHER PUBLICATIONS

Molga and Wronski, "Dynamic Filtration in Obtaining of High Purity Materials–Modelling of the Washing Process," *Proceedings of the Royal Flemish Society of Engineers,* Antwerp, Belgium, Oct. 1988, vol. 4, pp. 69–77.

Wronski and Mroz, "Problems of Dynamic Filtration," *Reports of the Institute of Chemical Engineering,* Warsaw Techn. Univ., T.XI, z.3–4, pp. 71–91 (1982).

Wronski, "Filtracja dynamiczna roztworow polimerow," *Inz. i Ap. Chem.,* No. 1, pp. 7–10 (1983).

Shitaro, Murase, Yamazaki, Iwata, and Inayoshi, "Patterns of Flow in a Filter Chamber during Dynamic Filtration with a Grooved Disk," *International Chem. Eng.,* vol. 27, pp. 304–310 (1987).

Watabe, "Experiments on the Fluid Friction of a Rotating Disc with Blades," *Bulletin of JSME,* vol. 5, No. 17, pp. 49–57 (1962).

ROTARY DISC FILTRATION DEVICE

BACKGROUND OF THE INVENTION

This invention concerns the field of filtration and more specifically, filtration using rotary discs and filters.

Filtration devices are used to separate one or more components of a fluid from other components. Common processes carried out in such devices include classic filtration, microfiltration, ultrafiltration, reverse osmosis, dialysis, electrodialysis, pervaporation, water splitting, sieving, affinity separation, affinity purification, affinity sorption, chromatography, gel filtration, and bacteriological filtration. As used herein, the term "filtration" includes all of those separation processes as well as any other processes using a filter that separate one or more components of a fluid from the other components of the fluid.

Filtration processes make use of the greater filter permeability of some fluid components than others. As used herein, the term "filter" includes any article made of any material that allows one or more components of a fluid to pass through it to separate those components from other components of the fluid. Thus, the term "filter" includes metallic and polymeric cloth filters, semipermeable membranes and inorganic sieve materials (e.g., zeolites, ceramics). A filter may have any shape or form, for example, woven or non-woven fabrics, fibers, fiber bundles, membranes, sieves, sheets, films, rods, and combinations thereof.

The components of the fluid that pass through the filter comprise the "permeate" and those that do not pass (i.e., are rejected by the filter or are held by the filter) comprise the "retentate." The valuable fraction from the filtration process may be the retentate or the permeate or in some cases both may be valuable.

A common problem in all filtration devices is blinding or clogging of the filter. Permeate passing through the filter from the fluid layer adjacent to the feed side of the filter leaves a retentate layer adjacent to or on that side of the filter having a different composition than that of the bulk feed fluid. This material may bind to the filter and clog its pores (that is, foul the filter) or remain as a stagnant boundary layer, either of which hinders transport of the components trying to pass through the filter to the permeate product side of the filter. In other words, mass transport through the filter per unit time (i.e., flux) is reduced and the inherent sieving capability of the filter is adversely affected.

Generally, fouling of the filter is chemical in nature, involving chemisorption of substances in the feed fluid onto the filter's internal (pore) and external surface area. Unless the chemical properties of the filter surface are altered to prevent or reduce adsorption, frequent and costly filter replacement or cleaning operations are necessary.

One of the most common causes of fouling arises from the low surface energy (e.g., hydrophobic nature) of many filters. U.S. Pat. Nos. 4,906,379 and 5,000,848, which are commonly assigned with this application, disclose chemical modification to increase the surface free energy (e.g., hydrophilicity) of filter surfaces. In general, however, relatively little attention has been given to modifying surface chemistry to reduce filter fouling. (U.S. Pat. Nos. 4,906,379 and 5,000,848 and all of the other patent documents, publications, and other documents cited in this application are incorporated herein by reference in their entireties for all purposes.)

In contrast to the chemical nature of most fouling problems, the formation of a boundary layer near the surface of the filter is physical in nature, arising from an imbalance in the mass transfer of feed fluid components towards the filter surface as compared to the back-transfer from the boundary layer to the bulk feed fluid. Some form of force (for example, mechanical, electrokinetic) must be used to promote the desired mass transfer away from the filter surface. Unfortunately, few strategies have been developed that promote adequate back-mixing to reduce the boundary layer or prevent its formation.

The most common strategy is called "cross-flow" filtration ("CFF") or "tangential flow" filtration ("TFF"). In principle, the feed fluid is pumped across (i.e., parallel to) the outer surface of the filter at a velocity high enough to disrupt and back-mix the boundary layer. In practice, however, cross-flow has several disadvantages.

An inherent weakness common to all TFF systems is that a significant pressure drop exists from feed inlet to feed outlet. This pressure drop, which is due to the high feed rate and the narrow feed channel required to improve filtration efficiency, causes the transmembrane pressure ("TMP") across the filter to be non-uniform. In fact, this non-uniformity in TMP is so great that in most instances the average TMP is sufficiently high to cause fouling of the membrane. This problem worsens when the feed rate is increased in an attempt to avoid this fouling because the non-uniformity in TMP increases with increased feed flow rate. The close coupling of the two key operating parameters that control filtration efficiency (TMP and feed rate) makes it difficult, if not impossible, to optimize and precisely control the filtration process.

Additionally, this makes scaling up TFF systems difficult. Many systems are scaled-up by adding membrane modules (and, thus, area) in series. Because that increases the fluid flow path length, that approach results in even higher pressure drops along the feed path and induces greater non-uniformity in TMP. The net result is greater unpredictability in performance as the scale increases.

Finally, many substances in process fluids can not withstand the high shear rates associated with the necessary high flow rates. For instance, the maximum allowable shear and/or velocity for many biological fluids are far too low to allow adequate back-mixing to reduce or eliminate the stagnant boundary layer. Furthermore, the required high feed rates as compared to the filtration rates require numerous feed recycles through the system, which are also undesirable. Thus, TFF is less desirable or cannot be used at all in many cases.

A different approach to eliminating the stagnant boundary layer involves decoupling the feed flow rate from the applied pressure. With this approach, a structural element of the filtration device, rather than the feed fluid, is moved to effect back-mixing and reduction of the boundary layer. The moving body may be the filter itself or a body located near the filter element.

The moving-body approach to enhance filtration often involves turbulent fluid flow (e.g., from the use of rotating and/or vibrating discs). Unfortunately, turbulent flow is energy inefficient and may damage delicate forms of matter (e.g., biologicals).

One of the rare moving-body devices that has enhanced filtration without turbulence is exemplified in U.S. Pat. No. 4,790,942 (commonly assigned with this application). This patent discloses the use of a filtration apparatus comprising outer and inner cylindrical bodies defining an annular gap for receiving a feed fluid. The surface of at least one of the bodies defining the gap is the surface of a filter, and one or both of the bodies may be rotated. Induced rotational flow between these cylinders is an example of unstable fluid stratification caused by centrifugal forces. The onset of this instability can be expressed with the aid of a characteristic number known as the Taylor number. Above a certain value of the Taylor number, a vertical flow profile comprising so-called Taylor vortices appears. This type of secondary flow causes highly efficient non-turbulent shear at the filter surface(s) that reduces the stagnant boundary layer thickness and, thus, increases the permeate flux.

In contrast to classic cross-flow filtration, the device of U.S. Pat. No. 4,790,942 allows the shear rate near the filtration surface and the transmembrane pressure to be independently controlled. Furthermore, because those two operating parameters are independent and high feed rates are not required to improve the permeate flux, the feed rate can be adjusted to avoid non-uniform transmembrane pressure distributions. Accordingly, mechanically agitated systems of this type enable precise control over the separation.

Taylor flow is only one example of instability associated with flow along curved walls. Flow along concave walls also may cause a similar kind of instability and can lead to a secondary flow characterized as Taylor-Goertler vortices. Transverse double toroidal secondary flow referred to as Dean flow is also known (see, for example, U.S. Pat. No. 4,311,589, particularly FIG. 2 and column 2, lines 3-17, and column 3, lines 9-25). U.S. Pat. No. 4,592,848 employs helical flow. A complex flow profile also exists within the gap between a rotating sphere within a stationary outer sphere in contrast to the uniform arrangement of Taylor vortices within the annular gap formed by rotating and stationary cylinders. With that two-sphere system, different flow regimes occur simultaneously side by side, and flow at the equator may be vortical but not at the poles. Non-uniform flow instabilities may also occur when rotating a disc in a fluid, and flow profiles typically have both purely laminar and turbulent regions. Under certain conditions, rotating a flat disc in a stationary fluid can develop flow profiles with regions of stationary vortices that assume the shape of logarithmic spirals. In general, flow profiles associated with rotating discs depend highly upon radial position and are quite non-uniform like those with concentric spheres and unlike those with coaxial cylinders. As discussed below, the lack of flow uniformity with rotating discs makes them undesirable for filtration applications because the lack of uniformity causes energy and other inefficiencies.

A number of filter systems using mechanical agitation currently exist. In U.S. Pat. No. 4,376,049 a circular design is employed in the form of a rotary apparatus. Centrifugal forces cause permeate to flow from the center of the rotor plate through the rotating filter elements. The vanes on the rotor plate holding the filter elements are curved rearwardly with respect to the forward direction of rotation. The curvature helps retain the filter elements in place and enhances the pumping capability of the system as the rotor is rotated in the forward direction. The filter elements eventually become clogged or packed with material and must be replaced.

In U.S. Pat. No. 3,477,575 one set of filter elements is mounted on a common shaft for rotation. A second set of filter elements is fixed on the inner wall of the device, and the rotatable and stationary filter elements are interleaved to create a serpentine flow path along which the feed fluid flows. Permeate is withdrawn through both sets of filters.

This type of filtration device was commercialized by the Swiss company Willi Bachofen. Because of the interleaving of the two sets of filter elements and because of the location of the feed fluid inlet and outlet, a substantial portion of the feed fluid flow is generally parallel to the major surfaces of the filters. Thus, although this device uses rotation of mechanical elements (one set of filters), it also uses cross-flow to help reduce stagnation at the fluid/filter interface.

Historically, such rotary filters have been used at relatively low rotation rates to dewater suspensions in so-called cake filtration (see Schweigler and Stahl, "High Performance Disc Filter for Dewatering Mineral Slurries," Filtration and Separation, January/February, pages 38-41 (1990)). Mass transfer from filter surface to feed fluid is poor in such cases, hence the build-up of a cake upon the filter. The thickness of such cakes can be limited by using scraper blades near the filter surface (see Ingersoll-Rand, "Upgrade your entire filtering and/or washing operation with the new Artisan Dynamic Thickener/Washer," Bulletin No. 4081, 4 pages (2/86); and Ingersoll-Rand, "Patented filter/wash capability permits simultaneous washing and filtering," Bulletin No. 4060, 4 pages (8/83)).

Another strategy for reducing the stagnant boundary layer adjacent to a rotating filter surface is to use high rotation rates, e.g., 1000 rpm. See Parkinson, "Novel Separator Makes Its Debut," *Chemical Engineering* (Jan. 1989), 1-page reprint by Aqua Technology Resource Management, Inc.; Aqua Technology Resource Management, Inc., "How to Keep Your Fluid Processing Budget from Going to Waste," 3-page brochure; and Aqua Technology Resource Management, Inc., 4-page brochure (untitled) discussing "Technology Background," "Overcoming Concentration Polarization," etc. However, use of a rotating filter element is complicated by the need for adequate rotary sealing means to maintain the separation of feed fluid from permeate. Also, the rotating filter and sealing means need to be strong enough to withstand centrifugal forces.

An alternative disc filter design utilizes a stationary filter and a closely spaced non-filter rotating element. Wronski, Molga, and Rudniak, "Dynamic Filtration in Biotechnology," *Bioprocess Engineering*, Volume 4, pages 99-104 (1989), report testing such a device against a device that has a stationary filter and an oppositely disposed rotating disc filter, and against a cross-flow device, and against a rotating cylindrical filtration device. In one comparison, the steady state flux through a rotating disc filter was about four times the flux through a stationary disc filter. In another comparison, the rotating cylindrical filter had the highest flux and the cross-flow device had the lowest flux and the highest energy consumption. In a third comparison, the rotating cylindrical filter had a flux over 30% higher than the flux in the stationary filter/rotating non-filter element device. See also Wronski and Mroz, "Power Consumption in Dynamic Disc Filters," *Filtration & Separation*, November/December, pages 397-399 (1984); Wronski, Rudniak, and Molga, "Resistance Model for High-Shear Dynamic Microfiltration," *Filtration & Separation*, Nov./Dec., pages 418-420 (1989); Rudniak and Wronski, "Dynamic Microfiltration in Biotechnology," *Proceedings 1st Event: Bioprocess Engineering*, Institute of Chemical and Process Engineering, Warsaw University of Technology, Warsaw, Poland, Jun. 26-30, 1989; Molga and Wronski, "Dynamic Filtration in Obtaining of High Purity Materials—Modelling of the Washing Process," *Proceedings of the Royal Flemish Society of Engineers*, Antwerp, Belgium, Oct. 1988, Volume 4, pages 69-77; Wronski and Mroz, "Problems of Dynamic Filtration," *Reports of the Institute of Chemical Engineering*, Warsaw Techn. Univ., T.XI, z.3-4, pages 71-91 (1982); and Wronski, "Filtracja dynamiczna roztworow polimerow," *Inz. i Ao. Chem.*, number 1, pages 7-10 (1983).

Murkes and Carlsson, *Crossflow Filtration—Theory and Practice*, 133 pages, John Wiley & Sons, New York (1988), particularly pages 22-26 and 69-125 and most particularly in Section 3.5 at pages 93-100, disclose that the flux of a stationary filter can be enhanced by rotating various elements near the stationary filter. The elements reported to have been tested include a cross, a double cross, a propeller, a spoke wheel, and discs either flat (plain) or having radial blades (vanes extending from the plane of the disc). According to Murkes and Carlsson, the flat disc was the least efficient. The increase in flux resulting from use of the other elements was accompanied by increased power consumption. That is consistent with findings by Watabe, "Experiments on the Fluid Friction of a Rotating Disc with Blades," *Bulletin of JSME*, Volume 5, number 17, pages 49-57 (1962), concerning the fluid friction of rotating discs that have protuberances or projections (i.e., blades) on their surfaces, including radial, concentric, and spiral blades, e.g., see the drawings of discs with backward and forward spiral blades at page 54.

Shirato, Murase, Yamazaki, Iwata, and Inayoshi, "Patterns of Flow in a Filter Chamber during Dynamic Filtration with a Grooved Disk," *International Chem. Eng.*, Volume 27, pages 304-310 (1987), describe a study to determine the effects on flow patterns of, among other things, the presence and dimensions of radial grooves in a rotating disc filter. The experimental apparatus had a stationary disc filter and a closely spaced rotating plate above it (see, e.g., FIG. 1 at page 305) but the study was carried out without actual filtration. The grooves provided significantly greater radial velocities and tangential velocities to the liquid in the filter chamber as compared to an ungrooved (i.e., flat) rotating disc and were beneficial in sweeping filter cake out of the filter chamber. A disc with eight radial grooves had a tangential fluid velocity nearly twice that of an ungrooved rotating plate. However, Watabe, "Experiments on the Fluid Friction of a Rotating Disc with Blades," *Bulletin of JSME*, Volume 5, number 17, pages 49-57 (1962), shows that increases in the number of radial blades beyond eight had little beneficial effect and that substantially more than eight reversed the beneficial effects and caused the rotating disc to behave as if it were a flat plate.

Accordingly, there is a need for mechanically agitated disc filters that, among other things, have reduced energy requirements and higher fluxes, that minimize the adverse effects of the filtration process (e.g., shear) on the feed liquid, retentate, and permeate, that have relatively simpler construction, that can be scaled up relatively easily, and that make the most efficient use of space in a process plant.

SUMMARY OF THE INVENTION

A new rotary disc filter that satisfies this need has now been developed. The filter of this invention provides still other benefits and advantages that will be apparent to those skilled in the art. Broadly, the rotary disc filtration device of this invention for filtering fluid to produce permeate and retentate comprises:

(a) a fluid filtration gap for holding fluid to be filtered, said gap being defined by two oppositely disposed substantially parallel closely spaced facing surfaces, one surface defining the gap being the first surface of a first filter through which the permeate passes from the gap and the other surface defining the gap being the surface of a disc, the surface of the disc or the surface of the filter having at least one spiral groove in fluid communication with the fluid when fluid is in the gap, the spiral groove subtending an angle Y in polar coordinates of at least ten degrees on the disc surface or filter surface;

(b) means for introducing fluid into the fluid filtration gap; and (c) means to rotate the disc or the filter to produce permeate.

In another aspect, the invention concerns a rotary disc filtration device for filtering fluid to produce permeate and retentate comprising:

(a) a fluid filtration gap for holding fluid to be filtered, said gap being defined by two oppositely disposed substantially parallel closely spaced facing surfaces, one surface defining the gap being the first surface of a first filter through which the permeate passes from the gap and the other surface defining the gap being the surface of a disc, the surface of the disc having at least one spiral groove in fluid communication with the fluid when fluid is in the gap, the spiral groove subtending an angle Y in polar coordinates of greater than forty-five degrees on the disc surface area that is oppositely disposed to the first surface of the first filter through which the permeate passes;

(b) means for introducing fluid into the fluid filtration gap; and (c) means to rotate the disc or the filter to produce permeate.

In still another aspect, the invention concerns a rotary disc filtration device for filtering fluid to produce permeate and retentate comprising:

(a) a fluid filtration gap for holding fluid to be filtered, said gap being defined by two oppositely disposed substantially parallel closely spaced facing surfaces, one surface defining the gap being the surface of a filter through which the permeate passes and the other surface defining the gap being the surface of a disc, the surface of the disc having a spiral groove in fluid communication with the fluid when fluid is in the gap, the groove subtending an angle Y in polar coordinates of greater than forty-five degrees on the disc surface area that is oppositely disposed to the surface of the filter through which the permeate passes, the two oppositely disposed surfaces being spaced apart not more than 50 millimeters and being at an angle to each other not greater than 10°, and the ratio of the average width of the groove to its average depth being in the range of 4/1 to 1/4;

(b) means for introducing fluid into the fluid filtration gap; and
(c) means to rotate the disc or the filter to produce permeate.

Yet another aspect of the invention concerns a process for filtering fluid in a filtration gap using a rotary disc filtration device to produce permeate and retentate comprising:
(a) providing a rotary disc filtration device comprising:
  (i) a fluid filtration gap for holding fluid to be filtered, said gap being defined by two oppositely disposed substantially parallel closely spaced facing surfaces, one surface defining the gap being the surface of a filter through which the permeate passes from the gap and the other surface defining the gap being the surface of a disc, the surface of the disc or the surface of the filter having at least one spiral groove in fluid communication with the fluid when fluid is in the gap, the spiral groove subtending an angle Y in polar coordinates of at least ten degrees on the disc surface or filter surface;
  (ii) means for introducing fluid into the fluid filtration gap; and
  (iii) means to rotate the disc or the filter;
(b) introducing fluid into the gap;
(c) rotating the disc or the filter to produce permeate and retentate.

Generally, the path of the spiral groove will subtend an angle Y (in polar coordinates from point Ri, where the spiral begins, to point Ro, where the spiral ends) of at least 10 degrees, usually greater than 45 degrees, desirably at least 90 degrees, more desirably at least 150 degrees, preferably at least 180 degrees, and most preferably at least 210 degrees.

The device usually will have the two oppositely disposed facing surfaces spaced apart from 1 to 100 millimeters, often 1 to 50 millimeters, desirably 1 to 25 millimeters, preferably 1 to 15 millimeters, and most preferably 1 to 10 millimeters. Spacings outside the range of 1 to 100 millimeters may be used if the other parameters can be adjusted so that the benefits of this invention are obtained. The width of that spacing (i.e., the gap width) may vary, depending on the radial distance from the axis of rotation of the rotating member. For example, the two surfaces may be conical, with their apexes pointing towards or away from each other or with one surface nested in the other.

The transverse cross-section of the inner surface of at least one of the spiral grooves will generally be curved and may be, e.g., partially elliptical or partially circular. In that context, "transverse" means perpendicular to the length or path length of the groove at the point at which the cross-section is taken.

The disc may be held stationary and the filter rotated, or both may be rotated, or preferably the filter may be held stationary and the disc rotated. The spiral groove(s) may be located only on the disc or only on the filter or the disc and filter may both have spiral grooves. The disc surface may also be a filter surface.

A plurality of discs and/or a plurality of filter assemblies may be used in one device. Each disc may have two oppositely disposed major surfaces, which may be substantially parallel, and each filter assembly may comprise two oppositely disposed filter major surfaces, which may be substantially parallel. The discs and filter assemblies may be interleaved, that is, arranged in alternating sequence, to define a plurality of fluid filtration gaps, each gap being defined by a disc and its immediately adjacent or proximate filter surface. At least one surface of each disc or filter in that device has one or more spiral grooves so that at least one surface facing each gap has a spiral groove. Desirably, each surface of each disc facing a filter surface has one or more spiral grooves. The rotation means may rotate some or all of the discs or some or all of the filters or some or all of the discs and filters of that device in unison.

An important feature of this invention is that spiral grooves, as opposed to radial grooves, concentric grooves, or other non-spiral grooves, are used on the surface of the disc or the surface of the filter defining the fluid filtration gap. The term "spiral" may be defined in many ways but one simple definition is that a spiral is the path of a point in a plane moving around a central point in the plane while continuously receding from or advancing toward the central point. A "groove" is a generally elongate depression, hollow, or cavity extending from the surface of the disc or filter to below the surface of the disc or filter, where the length of the groove is generally parallel to the surface. The "spiral groove" need not be a true spiral along the entire length of the groove. As discussed below, it has been discovered most unexpectedly that rotary disc filter devices having discs wit spiral grooves have better flux and other characteristics (e.g., energy efficiency) than devices with discs having non-spiral grooves or blades. Devices in which the spiral grooves are only on the surface of the filter and not on the disc are also believed to have unexpected advantages but may be more difficult to fabricate and therefore are not as preferred. Other features and advantages of this invention will be apparent to those skilled in the art.

BRIEF DESCRIPTION OF THE DRAWINGS

To facilitate further description of the rotary disc filtration device of this invention, the following drawings are provided in which.

Figure 1:
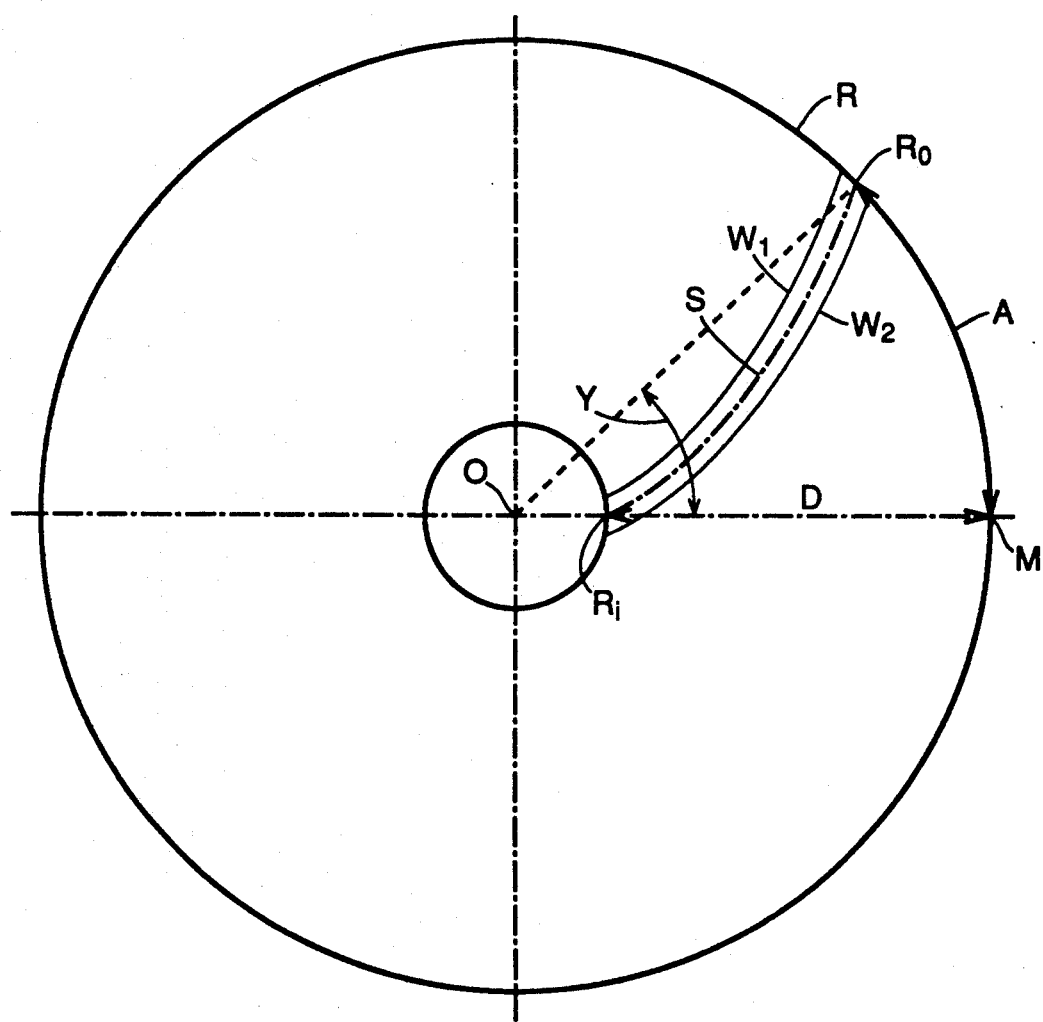
FIG. 1 is a plan view of a disc having radius Ro, origin O, a central imaginary circle of radius Ri, and a spiral groove that may be used in the present invention of path length S running (in polar coordinates) from (Ri, 0 degrees) to (Ro, Y degrees), angle Y being the angle subtended by the spiral.

These drawings are for illustrative purposes only and should not be construed to unduly limit the scope of the invention.

DETAILED DESCRIPTION OF THE INVENTION

The design of the rotary filtration device of this invention is not critical and any design may be used so long as the device has (i) at least two members with oppositely disposed facing surfaces (at least one of which surfaces rotates) that together define a filtration gap, the major plane of which gap may be substantially parallel to the two facing surfaces defining the gap, and (ii) means for effecting the rotation; wherein at least one of the two surfaces is a filter surface, the other surface is closely spaced to and substantially parallel to the filter surface, and at least one of the two surfaces defining the filtration gap has at least one spiral groove. Thus, it is within the scope of this invention to have a rotating disc surface itself also be at least in part a filter surface. It is also within the scope of the invention to have two oppositely disposed closely spaced filtration surfaces define the fluid filtration gap and to have spiral grooves on one or the other or both of those surfaces and to have one or the other or both of the surfaces rotate. Accordingly, use of the term "disc" does not preclude its surface facing and helping to define the filtration gap from also being a filter surface. Similarly, use of the term "filter" to refer to a mechanical element through which permeate passes and whose surface is the second surface facing and helping to define the fluid filtration gap does not preclude the filter surface from having one or more spiral grooves or from rotating.

If the filter surface facing and helping to define the fluid filtration gap is to have one or more spiral grooves, the filter should be rigid enough to hold the requisite spiral groove shape. In that case, rigid filter materials such as metal (e.g., sintered metal), ceramics, or glass might be suitable. It is preferred, however, that the filter itself not contain the spiral groove(s) used herein, that the disc surface helping to define the gap contain the one or more spiral grooves, and that the disc surface not also constitute a filter surface.

The filter may be made of any material so long as the filter can perform the functions required in accordance with this invention and is otherwise chemically and physically suitable under its respective operating conditions. Accordingly, the filter may be polymeric, metallic, ceramic, or of glass, and may be of any form or shape. Thus, the filter may be formed of particles or of a film or of fibers or of a combination of all three. The filter may be woven or non-woven. Generally, non-woven metal filters have certain advantageous features as compared with polymeric filters: they are easier to sterilize; generally have superior chemical and heat resistance; may be cleaned more easily; and have significantly better structural integrity and rigidity. If two or more filters are used in a device, they may be of the same or different material and filtration or sieving characteristics.

The filter used may be an asymmetric surface filter. An asymmetric surface filter is a filter whose two major faces have different distributions of pore sizes such that the average or median pore size on one face is significantly smaller than the average or median pore size on the other face. Desirably, the asymmetric surface filter is oriented in a device of this invention with the face having the smaller average or median pore size facing the fluid filtration gap and the face with the larger average or median pore size facing away from the gap. A preferred metal filter of this type is the DYNALLOY fiber metal filter marketed by Fluid Dynamics of DeLand, Flor. The use of a metal filter may be advantageous if one or more electric fields are also being used in the device or if the filter is to carry a charge.

One or more electric fields may be applied in axial, or radial, or non-radial non-axial directions. The fields may be useful in aiding separation and can be applied using known technology. In this context "axial" means along or parallel to the axis of rotation of a rotating member (disc or filter) and "radial" means along or parallel to a radius of the plane of a disc or filter. The field may be the result of direct or alternating voltage, e.g., a high frequency alternating potential. One or more fields in different directions may be applied, which together will result in a single imposed field. One or more fields may be varied as a function of time, e.g., one radial field and one axial field in interleaved on/off synchronization. Thus, the term "an electric field" as used in the claims and the specification should be understood to include all of the foregoing.

The key function of a filter is to freely pass the permeate and not pass the retentate. To do that efficiently, the permeate should adequately "wet" the filter. One indicator of wetting is the contact angle a drop of permeate forms when placed on the filter surface (see U.S. Pat.

Nos. 4,906,379 and 5,000,848). Generally speaking, the lower the contact angle, the greater the wetting, and, conversely, the larger the contact angle, the lesser the wetting.

If the fluid has a high free energy (e.g., high surface tension), a surface that has a sufficiently high surface free energy will be wet by that fluid more readily than will a surface with a low surface free energy. Similarly, a low energy level fluid (e.g., an oil) will wet a low energy level surface more readily than it will wet a high energy level surface. In short, the closer the energy levels of a fluid and a surface are to each other, the more readily that fluid will wet that surface.

Because it is preferred that the permeate readily wet the filter surface used to produce it and because contact angle is relatively easy to determine and is an indicator of wetting, a drop of permeate recovered using a device of this invention will usually have a contact angle on the filter used in that device of less than 45°, desirably less than 40°, more desirably less than 35°, most desirably less than 30°, preferably less than 25°, more preferably less than 20°, and most preferably less than 15°. The contact angle is measured using the method described in U.S. Pat. Nos. 4,906,379 (see, e.g., column 10, line 42 et seq.) and 5,000,848 (see, e.g., column 12, line 46 et seq.) and is also described in Whitesides, Langmuir, volume 1, pages 725-740 (1985).

Because water is a high energy liquid, principally because of hydrogen bonding, and because water is often a permeate in filtration processes, filters whose surface energy has been increased to increase their hydrophilicity may be used. Thus, filters having a high surface energy (e.g., those of regenerated cellulose and those in accordance with U.S. Pat. No. 4,906,379) are a preferred class of filters. Such filters are more easily wet by polar substances, such as water, but resist wetting by non-polar substances such as organic compounds, e.g., substituted and unsubstituted alkanes, alkenes, alkynes, and single- and multiple-, fused- and unfused-, saturated and unsaturated ring compounds and mixtures thereof, such as crude oil and petroleum products (mineral oil, gasoline, heating oil, refined oil, kerosene, etc.) and food oils (citrus oils, triglycerides, etc.). Such high energy filter surfaces also have a reduced tendency to become fouled by materials having low energy properties, such as proteins and other organic substances.

Broadly speaking, a drop of water on such a high energy filter surface will form a contact angle of about 30° or less (see U.S. Pat. No. 4,906,379). A device of this invention using a filter that allows water to pass (permeate) but rejects oil will find particular use in separating water from oil, e.g., in cleaning up oil spills. Alternatively, a filter that is relatively hydrophobic (low surface energy) and allows oil to pass and rejects water may be used. Other especially advantageous combinations of the device of this invention and filters having certain inherent properties (e.g., high rejection rate of certain materials but rapid and easy permeation of their co-components in the feed fluid) will be apparent to those skilled in the art. Use of such filters in combination with the device of this invention will provide advantages that may not be achievable without the combination.

The filter may have pores of any size or shape provided they are appropriate for the feed fluid and the permeate and can provide the separation desired. The filter may have a narrow or broad or other distribution of pore sizes and shapes and may be asymmetric and used as an asymmetric surface filter. The filter may have a relatively sharp molecular weight cut-off point.

The filter matrix, and particularly a polymeric filter matrix, may also have ligands attached to it for selective sorption applications (e.g., ion exchange/sorption, affinity sorption, and chelation). Suitable ligands include any ligand capable of attaching to the matrix or to a precursor or a derivative of the matrix.

Preferred ligands comprise (a) ion-selective affinity groups (such as chelator and cage types) that selectively bind inorganic ions and (b) bio-selective affinity groups that selectively bind biologically active substances. The inventory of affinity ligands is large and rapidly increasing. Most often, such ligands are derived from nature (i.e., substances of biological origin) while others are wholly or partially synthetic (i.e., bio-mimic substances). Preferred ligands, preferred methods for attaching ligands to membrane filters, and preferred membrane filters are taught in U.S. Pat. No. 4,906,379. Other useful ligands and methods for attaching the ligands to the filter will be known to those skilled in t e arts of affinity sorption, enzyme immobilization chelation, and the like. As used in the claims and the specification, the term "selective sorption ligands" includes all of the foregoing ligands.

Preferred filters used in this rotary disc invention are made in accordance with U.S. Pat. No. 4,906,379. Those preferred membrane filters are marketed by Membrex, Inc., the assignee of this application, under the trademark ULTRAFILIC.

Almost any fluid to be filtered can be filtered using a device of this invention, but it finds particular use in filtering feeds having high solids content, mixed phase fluids, and biological fluids.

High solids content fluids may be, for example, biological fluids, fluids containing affinity particles, (e.g., selective sorption affinity particles), particles of ion exchange resin, catalyst particles, adsorbent particles, absorbent particles, and particles of inert carrier. The inert carrier particles may themselves carry catalyst, resin, reactants, treating agents (e.g., activated charcoal), etc. Mixed phase fluids include liquid/solid, liquid/liquid, and liquid/gas systems. The fluid may contain more than two phases. The liquid phases may all be aqueous or non-aqueous or may be one or more aqueous phases and one or more non-aqueous phases together. The phases may be immiscible, e.g., two aqueous phases that are immiscible because each phase has a different solute. The fluid may have gaseous, liquid, and solid phases. Reaction and/or heat transfer may accompany the filtration process of this invention and take place inside or outside a device of this invention.

Biological fluids are fluids that originate from or contain materials originating from biological organisms (e.g., from the animal or plant kingdoms) or components thereof, including living and non-living things (e.g., viruses). Thus, the term "biological fluids" includes blood; blood serum; plasma; spinal fluids; dairy fluids (e.g., milk and milk products); fluids containing hormones, blood cells, or genetically engineered materials; fluids from fermentation processes (including fermentation broths and reactant, intermediate, and product streams from beer-making and wine-making); fluids containing or consisting of microbial or viral material, vaccines, plant extracts, or vegetable or fruit juices (e.g., apple juice and orange juice); fluids containing microorganisms (e.g., bacteria, yeast, fungi, viruses); and so forth. The device is particularly useful with fluids containing pressure-sensitive or shear-sensitive components, e.g., cells (blood cells, mammalian hybridomas, etc.). It is useful for filtering fluids containing drugs and precursors and derivatives thereof. It is also useful for filtering organic petroleum oil and food oil) as single or mixed phases (e.g., oil/water). It is also useful for filtering fluids containing surfactants, emulsions, or liposomes.

A plurality of discs and/or a plurality of filters may be used in a device according to this invention. Thus, it is within the scope of the invention to have a single disc disposed between two filters, thereby defining two filtration gaps. In such a device, one or both of the major faces of the disc would desirably each have at least one spiral groove. It is also within the scope of this invention for such a device to have several interleaved discs and filters, that is, discs and filters in alternating arrangement, so that several filtration gaps are defined. In that case, the discs could be mounted on a common shaft for rotation in unison and the permeate from the filters could flow to a common manifold for collection. In a device having a plurality of interleaved discs and filters, each surface defining a fluid filtration gap may have one or more spiral grooves.

Regardless of which elements (that is, the filter(s), the disc(s), or combinations thereof) rotate, rotation may be at a constant speed or at varying speeds and in a single direction or in alternating directions. If two or more members rotate, they may rotate in the same or different directions and at the same or different speeds. The rotating member(s) may periodically reverse its or their direction(s) of rotation (i.e., oscillate). Preferably the filter or filters are stationary and the disc or discs rotate and only in a single direction of rotation.

The disc(s) and/or filter(s) may translate axially (reciprocate) approximately perpendicular to the plane of rotation) whether or not it or they are the rotating element(s). The disc(s) and/or filter(s) also may be vibrated to aid filtration.

Each filter may be mounted on a filter support. Such a support is desirable, particularly if the filter does not itself have substantial structural rigidity. Preferably, a network of permeate collection passageways is disposed in the filter support in fluid communication with the downstream side of the filter (facing away from the fluid filtration gap) so that permeate passing through the filter flows into the permeate collection passageways. Any method of mounting the filter on its support may be used provided it does not unduly hinder operation of the device. Preferably, the method of mounting the filter does not significantly reduce the active area of the filter but such reduction may be necessary in some cases.

Feed fluid may be introduced into the fluid filtration gap continuously or in batches. Permeate may be removed continuously or in batches. Retentate may be removed continuously or in batches. Retentate containing one or more species concentrated from the feed fluid may be the desired product, e.g., for testing. The permeate product may be feed fluid from which particulate or other matter that would interfere with subsequent testing has been removed by the filtration device. Testing may be for the presence of or concentration of any chemical or biological species or for one or more physical or chemical properties (e.g., pH, temperature, viscosity, extent of reaction, specific gravity, chloride ion, antibodies, viruses and other microorganisms, sugars, ethanol). Thus, a device of this invention may further comprise means for physically and/or chemically testing the retentate and/or the permeate, e.g., for one or more of the foregoing species and/or properties (characteristics).

Desirably, the disc and its corresponding filtration surface(s) are mounted in a housing. The housing may be of any size or shape and of any material so long as the housing does not adversely affect performance of the device of this invention. Generally, the housing will be no larger than is reasonably required to house the disc(s) and the filter(s). A housing need not be used at all or the housing or a part of its bottom, top, and/or sides may be open and the device may be placed into a body of fluid (e.g., a lake, a fermentation tank) to produce a permeate and/or retentate product, e.g., for testing. The pumping action of the device can be used to move the feed fluid into the filtration gap from the body of feed fluid. Partial or complete immersion of the device allows fluid to flow into the fluid filtration gap.

A device of this invention may be used in many different ways, e.g., for monitoring a reaction (e.g., by testing, or for producing a testable fluid from, the reaction medium in a reactor or a reactor effluent stream), as an integral part of a reactor scheme (e.g., for separating catalyst from a reactor effluent stream for recycling to the reactor or for regeneration, or for continuously removing product and/or by-products and/or continuously replenishing nutrients in a cell culture reactor), or as part of a recovery scheme (e.g., for separating products, by-products, contaminants, etc. from a reaction or process stream). The device may be located in situ in any type of process vessel (e.g., reactor) or pipeline (e.g., reactor effluent piping or slip-stream piping) for any purpose (e.g., producing a testable fluid) where filtration needs to be performed continuously or intermittently.

Although there are no theoretical upper or lower limits on the diameter of the disc and filter, because of the speed of rotation, which may vary anywhere from under 100 rpm to 1000 rpm or higher, and because of engineering, fabrication, and cost constraints, the rotating member(s) of the filtration device will rarely be more than one or two meters in diameter. Accordingly, to increase the capacity of a device of this invention beyond the capacity provided by discs and filters approximately one or two meters in diameter, it is preferred that the filtration capacity be increased by adding additional discs and/or filters as needed. Regardless of the disc and filter diameters, capacity can always be increased by adding more discs and filters to a single device or by connecting two or more devices in series or parallel. A plurality of discs and/or filters may be mounted in a common housing. Generally, a device according to this invention using a plurality of interleaved discs and filters requires a smaller equipment volume than a cylindrical rotary filtration device providing the same filtration area.

The disc may be made of any material and have any design or shape provided it has the requisite physical and chemical properties so that it can perform its function according to the present invention. Because the disc may be rotated according to the present invention and because it is desirable that the disc not deform during the filtration process, the disc requires a certain minimum structural rigidity. Also, the disc preferably should be relatively inert chemically to the feed fluid. Generally, the disc will be made of metal although other materials such as ceramics, glass and polymers may be used. Preferably, the surface of the disc facing the filtration gap, including the inner surface(s) of the one or more grooves, is relatively smooth. Preferably, the surface of the filter, including one or more grooves (if used on the filter), is relatively smooth. A rough surface favors the onset of turbulent flow in the fluid in the filtration gap at lower rotation rates, which flow is energy inefficient and filtered.

Generally, the periphery of the disc and of the filter will be circular, although other shapes may be used. The center of the disc will generally coincide with the center of the filter and both centers will usually lie on the axis of rotation of the rotating element(s). The peripheries of the disc and of the filter will usually be approximately the same radial distance from the axis of rotation. It is possible, but less desirable, to have more than one disc facing a single filter to define a plurality of filtration gaps on the same side of the filter or to have more than one filtration surface facing a single disc to define a plurality of filtration gaps. Usually, however, one disc surface will face a single filter surface and the peripheries of each will be approximately the same distance from the axis of rotation.

Preferably, the surface of the filter is substantially planar. Depending on the type of filter and its surface, the surface may have microconcavities and microconvexities; however, their presence is not inconsistent with the filter surface being considered to be substantially planar. Furthermore, if the filter surface contains one or more grooves and even if those grooves occupy almost the entire filter surface and have depths of 5 millimeters or more, that will still not prevent the filter surface from being considered to be substantially planar.

Similarly, the disc surface helping to define the fluid filtration gap is preferably also substantially planar, and the presence of microconcavities, microconvexities, and grooves with depths of 5 to 10 millimeters or more will still not prevent the filter surface from being considered to be substantially planar.

Although the disc and filter surfaces are preferably planar (e.g., for ease of fabrication), they need not be planar. For example, either or both may have axial cross-sections that are conical, trapezoidal, or curved. In fact, any shape may be used provided the benefits of this invention can still be achieved. Because the width of the fluid filtration gap ("h") may vary, the two surfaces defining the gap may, for example, be closer to each other at their centers or at their peripheries. If both surfaces have the same cross-sectional size and shape, they may be oriented so that the gap width is constant, e.g., as where both disc and filter are conical and are nested.

It is preferred that neither the disc nor the filter have any significant non-spiral protuberances (e.g., non-spiral blades or vanes) extending into the fluid filtration gap because their presence will tend to adversely affect, for example, energy efficiency.

Preferably, the disc surface and the filter surface defining the fluid filtration gap will be substantially parallel, that is, the planes of the two surfaces will not be at an angle to each other exceeding approximately 30°, desirably 20°, more desirably 15°, preferably 10°, and most preferably will not be at an angle to each other exceeding 5°. Larger angles tend to reduce the benefits of the present invention. Even if a member (disc or filter) is, strictly speaking, non-planar (e.g., conical discs and filters), the member still will be considered to have a major plane of its general orientation, and it is that plane which should be used in determining whether the planes are substantially parallel.

A device according to this invention may be oriented horizontally, vertically, or diagonally, that is, the axis of rotation of the disc and/or filter elements may be horizontal, vertical, or diagonal. In a vertically oriented device having one disc and one filter, the disc may be above the filter or the filter may be above the disc. Regardless of the number of discs and filters and the orientation of the device, it is desirable that the fluid filtration ga be kept filled with fluid during filtration.

Rotation of the disc(s) and/or filter(s) may be achieved using any direct or indirect means, for example, an electric motor, a motor coupled via pulleys and drive belt or by gear transmission, or a magnetic drive. Axial translation of the disc(s) or filter(s) and vibratory movement may be accomplished using known technology.

In contrast to classic cross-flow filtration devices, the shear rate near the filtration surface and the transmembrane pressure or transmembrane pressure differential (TMP) in a device of this invention can be controlled independent of one another. (Despite the fact that the filter used herein need not be a membrane, the term "transmembrane pressure" is used because it is a common term.) Furthermore, because the permeate flux does not depend upon the feed rate, the feed rate can be adjusted to minimize non-uniform TMP distributions. Because of these features, a filter system of this invention enables precise control over the separation and can be operated and controlled in a variety of ways. For instance, the permeate flow can be controlled by a metering pump and the retentate concentration controlled by setting the ratio of feed to permeate flow rates. Alternatively, two pumps, one upstream and one downstream of the filter device, may be used to give the desired concentration factor of the retentate and the desired permeate flow rate. Control of the system can also be achieved with flow control valves and pressure control valves. Many of the advantages of this invention are made possible by the fact that all the key operating parameters (shear rate, transmembrane pressure, and feed, retentate, and permeate rates) can be independently controlled and manipulated. These advantages will be apparent to one skilled in the art.

The control system for the filtration device may provide for continuous or batch addition or withdrawal of feed fluid and/or permeate and/or retentate. The design of the peripheral equipment used with the filtration device is not critical. Off-the-shelf technology may be used for the addition, collection, and withdrawal of fluid, for the control system, the rotary drive means, etc. The design and selection of all of this peripheral equipment is within the skill of the art.

Generally, the operating pressure and transmembrane pressure in the device can be any values that do not interfere with the filtration process or adversely affect the feed or product fluids. Thus, a transmembrane pressure only slightly above atmospheric pressure may be used or the transmembrane pressure may be substantially higher. Generally, lower transmembrane pressures are preferred because they tend to minimize solids build-up on the surface of and within the filter. Also, lower operating pressures are generally preferred because they tend to make the equipment less costly. However, in some cases it may be desirable to use higher operating pressures to aid filtration. For instance, when processing carbonated beverages, the operating pressure must be kept sufficiently high to prevent degassing. It may also be desirable to use other forces, for example, electromotive force, to aid filtration in certain cases.

A feature of this invention is that one or more spiral grooves are used on one or more of the surfaces defining the fluid filtration gap. A groove is a long narrow channel or depression. It may also be thought of as an elongate concavity or depression whose length lies in a plane parallel to the surface in which the groove is located.

The term "spiral" may be defined in many ways but one simple definition is that a spiral is the path of a point in a plane moving around a central point in the plane while continuously receding from or advancing toward the central point. Thus, as shown in FIG. 1, in polar coordinates the path of the spiral increases in radial position R (distance from the origin O) with an increase in angle Y (the angle formed by rotating the line along which radial position R lies). The path length, S, of a spiral is commonly expressed in terms of disc radius. However, while a line describing a spiral has only one dimension, length, and therefore can begin at the origin, a groove cannot because a groove has three dimensions (length, width, and depth). Thus, the innermost end of a groove must be displaced from the origin or central point (e.g., center of rotation of a disc) by some distance. Consequently, the path length of a spiral groove may range from a value less than R to a value greater than R. Referring again to FIG. 1, a spiral groove beginning at radial position Ri displaced from the center O, ending at radial position Ro, and subtending angle Y will have path length S (S being the centerline of the groove where W1 and W2 are the sidewall edges of the groove) such that:

$$[(Y/180) \times (pi \times Ro)] + Ro - Ri > S > R0 - Ri$$

where Y is in degrees. Dividing Y by 180 and multiplying by pi converts degrees to radians. Thus, the value in brackets is equal to the arclength A from point M in FIG. 1 to point Ro. Accordingly, arclength A plus the difference D between Ro and Ri must be greater than length S and length S must also be greater than D.

As the radius of the disc increases, there is a greater opportunity for a spiral groove to subtend larger values of Y and give longer spiral groove path lengths S. With greater groove width, there is less opportunity. Hence, although a spiral groove used herein may subtend an angle Y (in polar coordinates) of 10 degrees or less, it generally will subtend an angle Y of at least 10 degrees, usually more than 45 degrees, desirably at least 90 degrees, more desirably at least 150 degrees, preferably at least 180 degrees, and most preferably at least 210 degrees.

Figure 2:
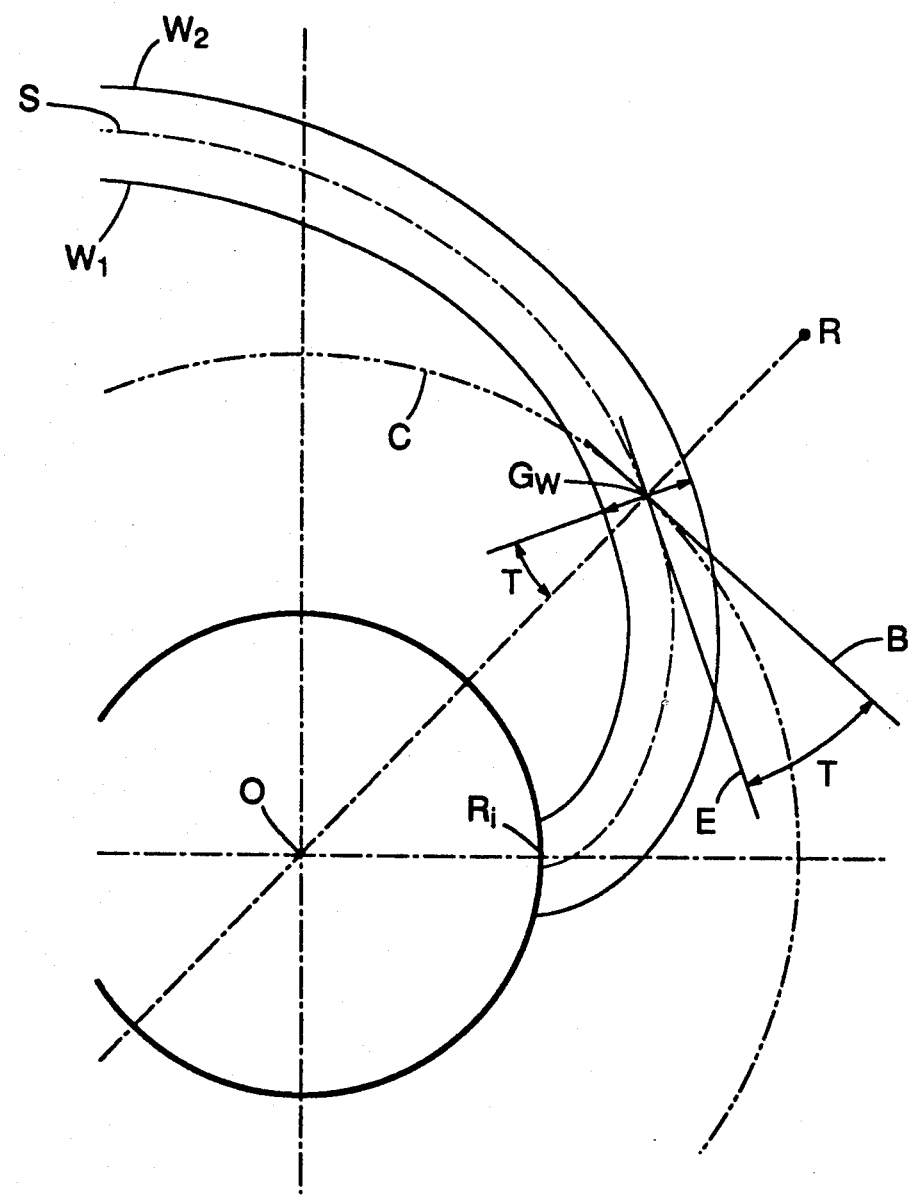
FIG. 2 is a partial plan view of a disc having a spiral of path length S and illustrating the meaning of angle T, which is an indication of the curvature of the spiral.
Figure 3:
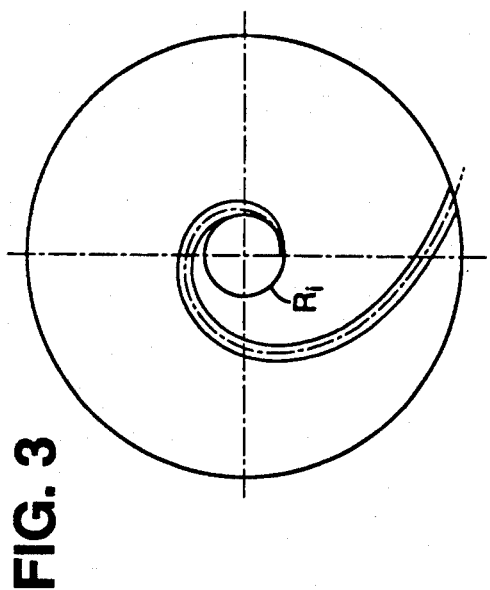
Figure 7:
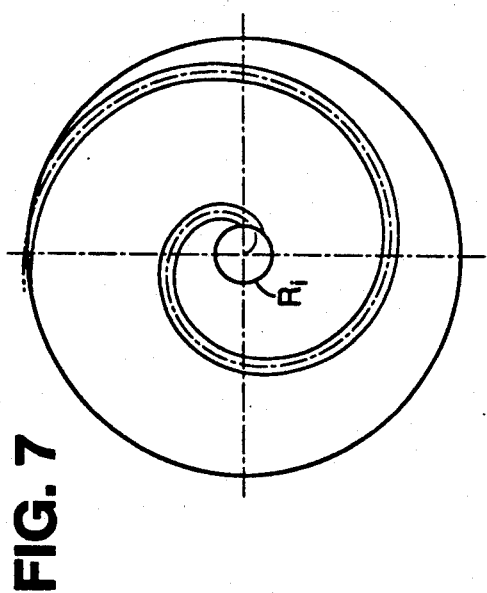
Figure 9:
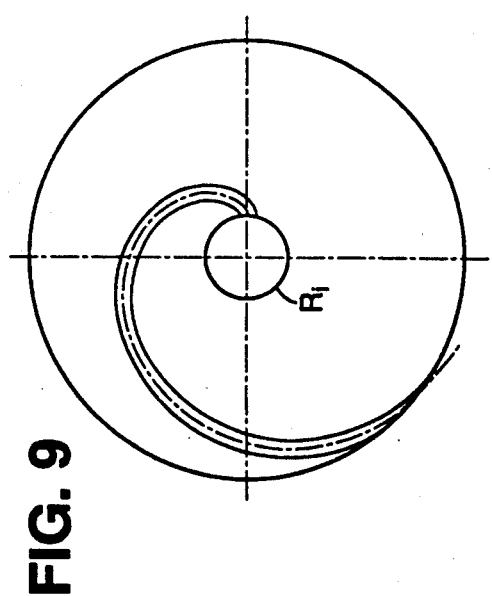

In FIG. 2 the spiral groove starts at Ri and has path length S and sidewall edges W1 and W2. Angle T formed between line segment or radius OR and a line segment representing the groove width Gw relates to the degree of curvature of the groove. Angle T can be understood as indicating the extent to which the curvature of the groove departs from that of an imaginary circle (indicated by reference letter C) whose center is also at origin O and whose circumference passes through the point on path length S at which angle T is measured, which is where S intersects line segment Gw. Angle T is also the angle between line E, which is tangent to groove centerline or path length S, and line B, which is tangent to circle C at the same point (i.e., where S intersects line segment Gw). Thus, in a limiting case, if angle T is zero degrees, the groove's curvature is that of a circle, and when angle T is 90 degrees the groove lies along a radius. As an example, an advancing spiral groove may begin with an angle T equal to or close to 90 degrees near the center of a disc at an imaginary circle of radius Ri and as the groove progresses toward the periphery of the disc, angle T may decrease to a value close to zero degrees. A spiral groove of the involute type meets this description (see FIG. 9). Other types of spirals are shown in FIG. 3 (hyperbolic), FIG. 5 (logarithmic), and FIG. 7 (Archimedean).

Figure 4:
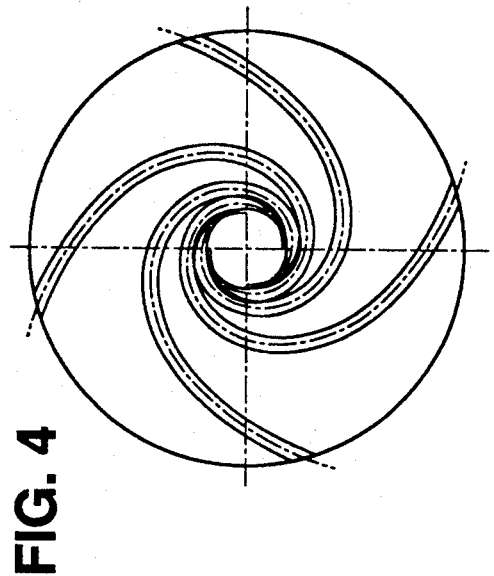
FIGS. 3 to 10 are plan views of discs having spiral grooves of different types on their surfaces.
Figure 6:
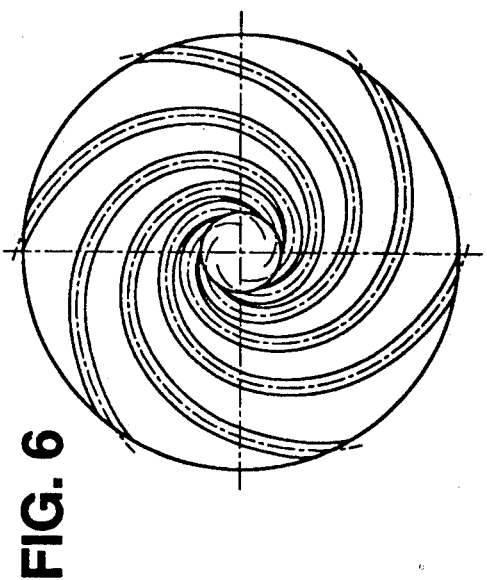
Figure 8:
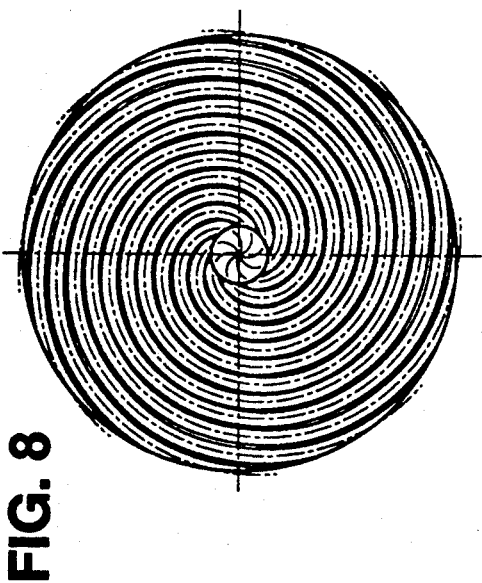
Figure 10:
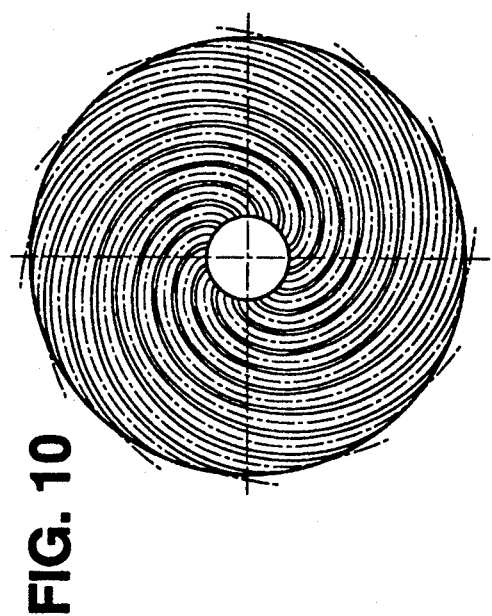

A rotating disc (or filter) may have more than one spiral groove, as shown in FIG. 4 (four hyperbolic spirals), FIG. 6 (six logarithmic spirals), FIG. 8 (eight Archimedean spirals), and FIG. 10 (twelve involute spirals). Having a single spiral groove may create a dynamic imbalance on a member, in which case two or more members having single grooves may be stacked upon a common rotating drive shaft with their grooves oriented appropriately to provide counterbalance. Alternatively and desirably, two or more grooves may be employed upon a single member to achieve the necessary balance.

Figure 5:
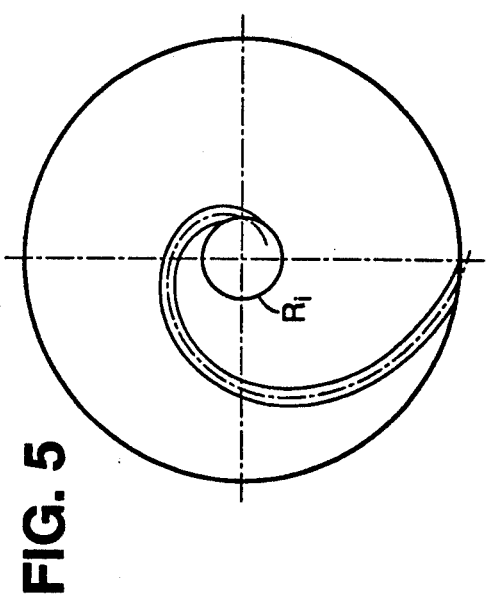

Referring to FIGS. 1 to 10, the spiral grooves may commence at positions displaced from the center of rotation of a disc at an imaginary circle of radius Ri. FIGS. 4, 6, 8, and 10 show that the number of spiral grooves that can intersect or commence at that inner circle is limited by the circumference of that imaginary circle, the groove width, and the angle at which the grooves intersect that circle. FIG. 5 shows that logarithmic spiral grooves (log R/Ri=kY, where k is a constant) intersect the imaginary central circle at an acute angle. Thus, this type of spiral groove will occupy a greater amount of the circumference of that imaginary circle than will an involute spiral (FIG. 9; R=Ri secant Y), where the spiral intersects orthogonally. Accordingly, the number of spiral grooves that can occupy a disc will be limited by the angle of curvature at which each groove commences at the central area, other things (groove width, distance from the disc center, etc.) being equal. Additionally, for some number of grooves of width Gw for a given disc, further addition of grooves (assuming that is otherwise possible) will cause them to overlap (i.e., interfere) within this central circular commencement area of radius Ri. Such overlap erodes this central area and effectively constitutes an increase in the diameter of that central circular area.

The section of the circumference of that imaginary central circle occupied by the groove is an arc from Y1 to Y2 subtending an angle Yi, which angle equals Y2 minus Y1 and which is approximated as $$Yi = \frac{Gw/\cosine(90 - T)}{Ri}$$

Figure 11:
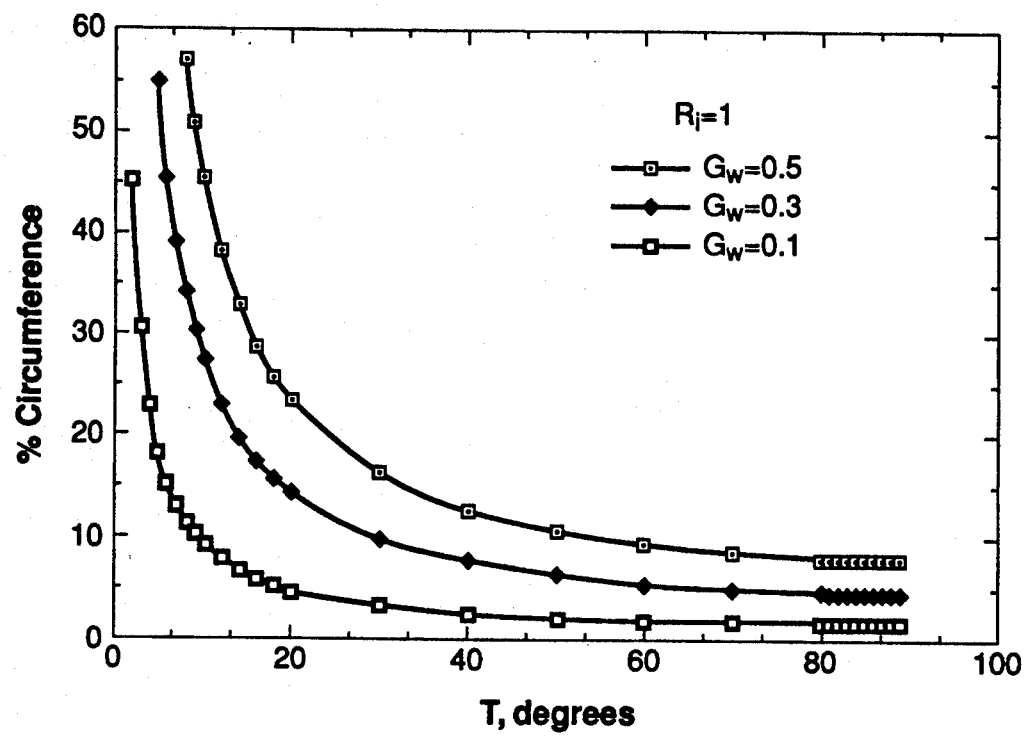
FIG. 11 is a plot showing what fraction of the circumference of a circular disc a spiral groove occupies as a function of the width of the groove and the angle at which the path length of the groove intersects the circumference.

The arc as percent of the circumference is illustrated in FIG. 11 as a function of the angle T. The underlying data were calculated using a value of Ri equals one unit with Gw values ranging from 0.1 to 0.5 units. Over the range of T values, the same percentage of circumference can be achieved by adjusting Ri in proportion to Gw. For example, it is evident that the curve in FIG. 11 for Ri=1 cm and Gw=1 cm is the same as the curve for Ri=2 cm and Gw=2 cm. Generally, however, it is preferred to minimize Ri to achieve a greater total groove area on the disc. As the groove width diminishes, the disc may carry more grooves as well as utilize angles T that are smaller (i.e., farther from being perpendicular, at 90°, to the imaginary central circle). Considering all factors, the arc of the central circle of radius Ri occupied by a spiral groove may be 75% or less, usually it will be 50% or less, desirably it will be 40% or less, preferably it will be 30% or less, and most preferably it will be 20% or less.

A spiral groove of this invention of width Gw will desirably intercept the periphery of the disc, which has radius Ro. Since Ro is greater than Ri, the outer circumference of radius Ro can accommodate more grooves and of larger widths than can the inner circle of radius Ri. The section of that circumference occupied by the groove is an arc from Y1 to Y2 subtending an angle Yo, which angle equals Y2 minus Y1 and which is approximated by:

$$Y_o = \frac{Gw/\text{cosine } (90 - T)}{Ro}$$

The arc of the circumference of radius Ro occupied by a spiral groove may be 50% or less of the circumference, usually it will be 30% or less, desirably it will be 20% or less, preferably it will be 15% or less, and most preferably it will be 10% or less.

Although a spiral groove used herein will continuously recede from or advance toward whatever point is considered to be the central point for that spiral for at least part of the length of the spiral, the groove need not be a spiral along its entire length. The central point for a spiral groove need not correspond to the center of the surface in which the spiral is located or to the axis of rotation of the device. Accordingly, the surface in question may have a groove that starts near the center of the surface, meets the foregoing definition of a spiral along its entire length, and terminates at the periphery (for example, circumference) of the surface. Alternatively, however, the groove may start and end at any points between the center of the surface and the periphery, and the groove need not be a true spiral along its entire length.

The spiral grooves used herein preferably are but need not be continuous. A surface may have more than one spiral, in which case the spirals may start and/or end at different distances from the center of the surface. If more than one spiral groove is used on a surface, the grooves may cross each other and need not have the same shape or curvature or central point or transverse cross-sectional shape or area. The spirals need not end at the periphery of the surface. The spirals need not be on the rotating member(s). Preferably, however, the one or more spiral grooves used are located on the surface of the disc, the disc rotates, feed is introduced to the fluid filtration gap at or near the axis of rotation, the grooves are true spirals, start near the axis of rotation, extend to the periphery of the disc, and do not cross over each other.

Preferably the grooves are oriented on the surface and the surface is rotated in a direction so that the outer peripheral end of each groove points or faces away from the direction of rotation. That tends to reduce the force of impact of fluid exiting the groove on the inner wall of the housing.

The grooves used herein desirably are generally concave in transverse cross-section and usually do not have any convexities. Preferably the inner surface of the transverse cross-section of the groove is a smooth continuous curve, for example, a section of an ellipse or circle or combinations thereof. The groove may also have straight walls and be, for example, triangular, rectangular, or square in cross-section. The transverse cross-section may also have straight and curved portions. A groove used herein preferably is of constant width and depth but those dimensions may vary along the length of the groove.

The ratio of groove width to disc (or filter) radius will usually be from 0.001 to 0.6, preferably from 0.01 to 0.5, and most preferably from 0.01 to 0.4. The width may vary along the groove path length such that the ratio of groove width to radial location (R) changes. Ratios of groove width to disc (or filter) radius outside the range of 0.001 to 0.6 may be used if the other parameters (e.g., speed of rotation) can be adjusted so that the benefits of this invention are achieved.

Although the ratio of groove width to groove depth may be varied over a wide range, there are limits to the ratio if the benefits of this invention are to be obtained. For example, for a given groove depth, as the width of the groove increases, at some point the groove may become so wide that even if the rotation rate is increased, the benefits of this invention still can not be achieved. Thus, for a spiral groove to be useful in this invention, the ratio of the average width of the groove to its average depth will generally not exceed 6/1, desirably not exceed 5/1, more desirably not exceed 4/1. Ratios of average groove width to average groove depth will generally not be less than 1/10, desirably not less than ⅛, more desirably not less than 1/6, preferably not less than 1/5, and most preferably not less than ¼. A preferred range of ratios is 4/1 to ¼ of average width to average depth. The width or depth may vary along the groove path such that this ratio changes. Ratios outside the range of 4/1 to ¼ may be used if the other parameters can be adjusted so that the benefits of this invention are achieved.

The depth of the groove is measured from an imaginary plane lying on the grooved surface of the member (disc or filter). If there is no single imaginary plane that lies on the surface, the groove depth is measured from an imaginary plane lying on the lands immediately adjacent and defining the sides of the groove.

The length of the spiral groove depends on where the groove starts, where the groove ends, the tightness of the spiral, the width of the groove, and the size of the surface covered by the spiral. Thus, a spiral groove according to the present invention may range in length from only a few centimeters to a few meters or more.

Figure 12:
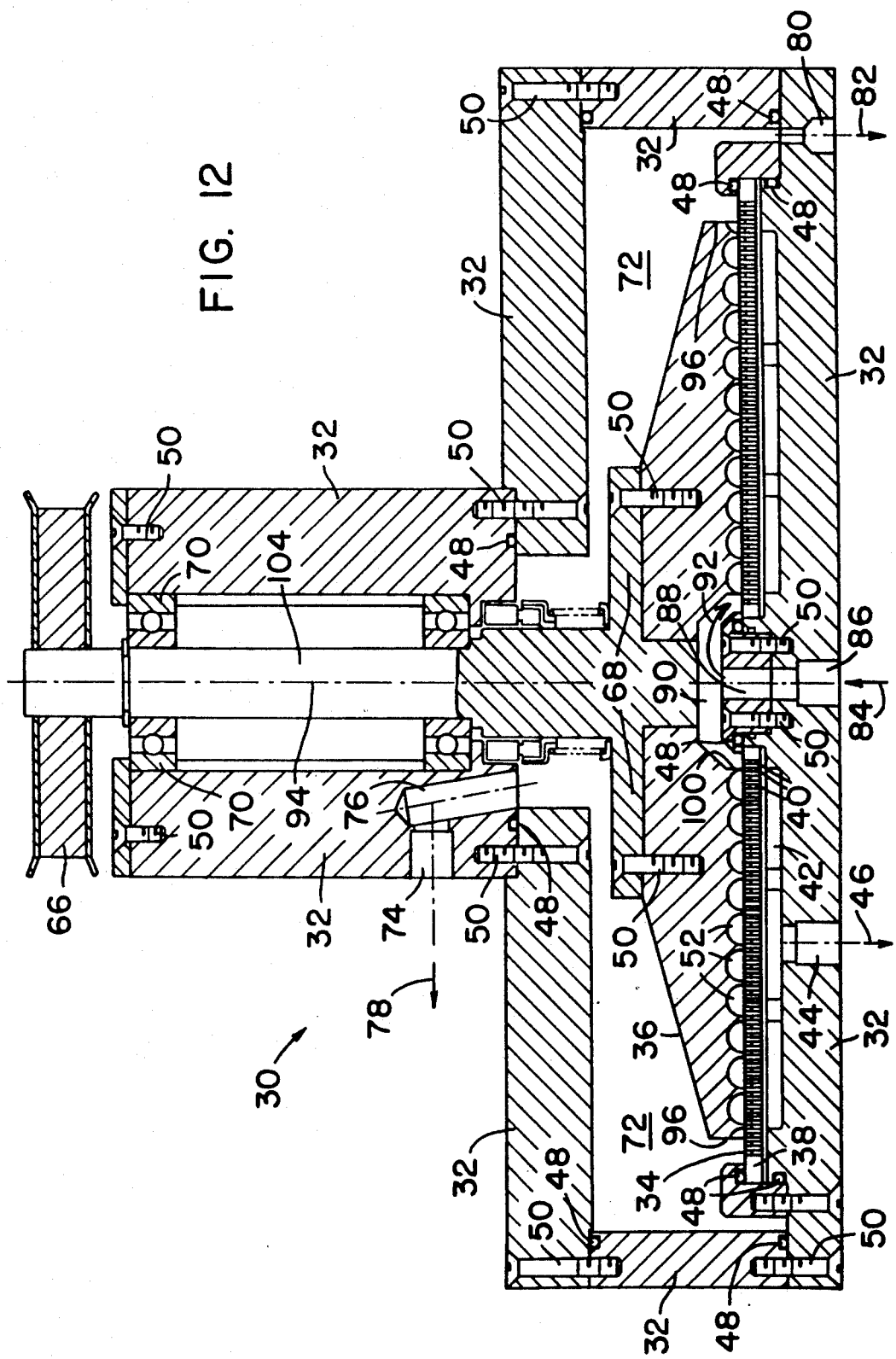
FIG. 12 is a cross-sectional elevational view of a laboratory scale device according to the present invention.

With this background, we turn to FIG. 12, which is an elevational cross-section of a preferred device (generally referred to as device 30) according to the present invention. Device 30 comprises housing 32, filter 34, and disc 36. Filter 34 is disposed above and rests on filter support 38, which has fluid channels 40 (see also FIG. 14) for collection of permeate that passes through the filter. The permeate passes through header 42 and out of the device (as indicated by arrow 46) through permeate discharge port 44.

The various housing members are held together by screws 50 and fluid leaks and mixing of the permeate and retentate are prevented by seals 48. Disc 36 is connected to drive shaft 104 having centerline (axis of rotation) 94 by screws 50, which fix the top of disc 36 against shaft extensions or wings 68. Shaft 104, and thus disc 36, are rotated by means of drive pulley 66 and a drive belt and motive means that are not shown. Shaft 104 is rotatably held in housing 32 by rotary bearings 70.

Fluid to be filtered (indicated by arrow 84 at the bottom of FIG. 12) enters the device through feed inlet port 86, flows upward through feed passageway 88, into distribution chamber 90, and down (as indicated by arrow 92) into the feed filtration gap defined by the lower surface of disc 36, which has grooves 52, and the upper filtration surface of filter 34.

Liquid that flows from feed distribution chamber 90, located at the axis of rotation of the disc, through the filtration gap to outer periphery 96 of the disc without passing through filter 34 enters plenum 72. Some recirculation of fluid in plenum 72 back into the fluid filtration gap occurs. Retentate may be withdrawn from plenum 72 as indicated by arrow 82 through lower retentate port or drain 80. If the device is operated so that the plenum is completely filled with liquid, retentate from plenum 72 may also leave the device through passageway 76 and upper retentate port 74, as indicated by arrow 78.

Figure 13:
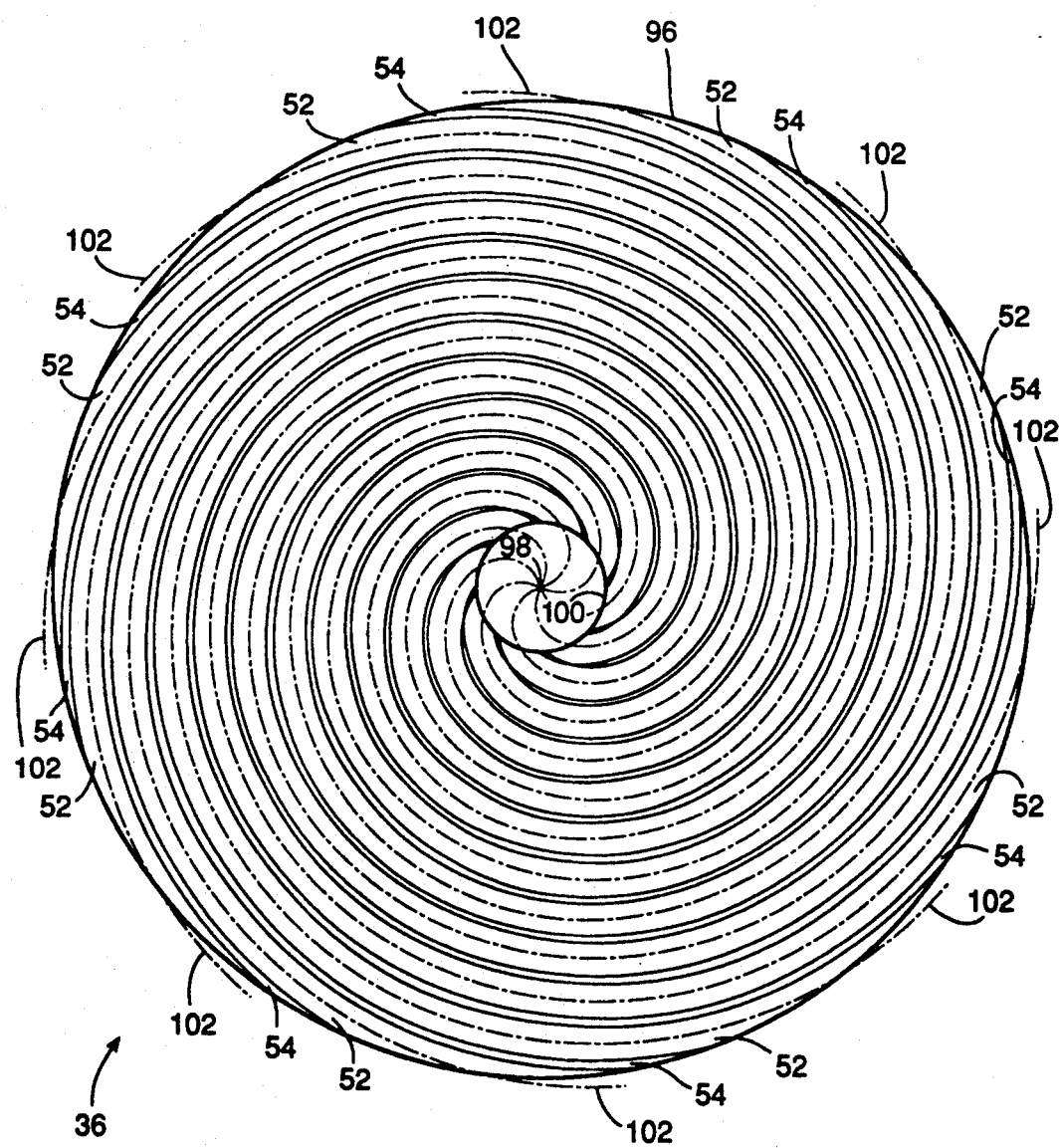
FIG. 13 is a plan view looking at the major surface of a preferred disc of this invention used in the device of FIG. 12, wherein the major surface faces and helps define the fluid filtration gap, the disc surface having eight spiral grooves.

FIG. 13 is a plan view of the surface of disc 36 that faces the fluid filtration gap in the device of FIG. 12. Reference numeral 98 indicates the imaginary center of the disc. Reference numeral 100 indicates the centrally located cut-out in disc 36. Reference numeral 96 indicates the periphery or circumference of disc 36.

There are eight spiral grooves 52 separated by eight lands 54 on the disc. As shown in FIG. 12, the transverse cross-section of each groove 52 is approximately semi-circular. Each of the eight dotted-and-dashed lines 102 (also referred to as groove path length S) indicates the bottom of a groove and lies along the length of the groove. Because of cut-out 100, the grooves start at the edge of cut-out 100. The eight imaginary lines 102 meet at imaginary center 98 of the disc. When this disc is used, it preferably is rotated clockwise with reference to FIG. 13, that is, the peripheral ends of the grooves preferably face away from the direction of disc rotation. That reduces the impact on the inner housing wall of fluid exiting the spiral grooves.

Figure 14:
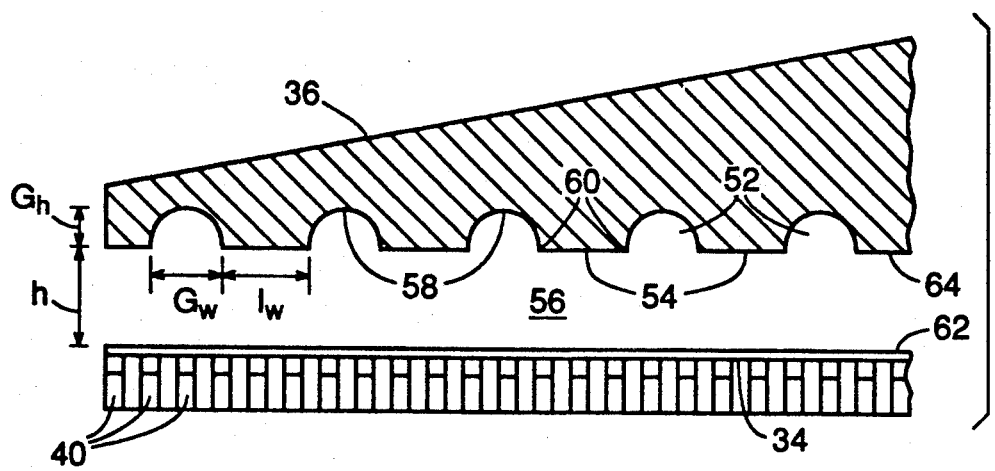
FIG. 14 is an enlarged cross-sectional view of portions of the rotary disc and oppositely disposed filter of FIGS. 12 and 13 according to this invention.

FIG. 14 is an enlarged detail view of the device of FIG. 12. Filtration gap 56 is defined by oppositely disposed substantially parallel filter surface 62 and disc surface 64. Filter surface 62 is substantially planar and disc surface 64 is substantially planar. Grooves 52 are separated by lands 54 and have inner transverse cross-sectional surfaces 58. The sides 60 of each groove (previously referred to as sidewall edges W1 and W2) are also the edges of lands 54. Land width is indicated by lw, groove width is indicated by Gw, groove depth is indicated by Gh, and the width of the fluid filtration gap between surfaces 62 and 64 by h.

Because the present invention requires the use of at least one spiral groove, the groove can not be a radial groove, that is, the length of the groove can not correspond to a radius of the disc. In other words, groove centerline 102 (see FIG. 13) can not correspond to a radius (in that case, angle T would be 90° along the entire groove path). Furthermore, the groove can not be a concentric groove, that is, the entire groove can not be at a constant distance from the axis of rotation of the disc, which is also the center of the surface on which the groove is located (in that case, angle T would be zero degrees along the entire groove path).

As discussed herein, the tightness of a spiral can affect the ability of the spiral groove to provide the benefits of this invention. The adjacent turns of a "tight" spiral are relatively close; the adjacent turns of a "loose" spiral are not relatively close.

In FIG. 13, the percentage of the surface of the disc occupied by grooves is about 90%, the width of each of the eight lands 54 is about 2 millimeters, the groove width is about 9-10 millimeters, and the groove depth is about 4-5 millimeters. The surface of the disc is considered to be the imaginary plane that includes or just touches the bottoms (in FIG. 12) or tops (in FIG. 13) of those lands. Thus, in FIG. 12 the gap width (clearance) between the disc and the filter is the distance from the bottom of the lands to the filter surface. If that clearance is 3 millimeters, the bottoms of the valleys of the grooves are 7–8 millimeters from the surface of the filter (3 millimeters distance from filter surface to land plus 4–5 millimeters groove depth). However, that disc might also be considered to be a disc whose surface is 7–8 millimeters from the filter and which has eight closely spaced spiral blades of roughly curved triangular or trapezoidal cross-section projecting about 4–5 millimeters from the surface of the disc.

It makes no difference whether an element (disc or filter) has one or more structural features called "lands" or "blades" (a) so long as those structural features form a path on that element that is within the scope of the term "spiral groove" as defined and exemplified throughout this application and claims and (b) so long as the benefits of this invention can be obtained with that element having that path.

It is believed that a surface having projections (whether called lands or blades) that are too short in length or subtend an angle Y of less than 5° or contain sharp angles will probably cause undesirable turbulence and/or be less efficient and, therefore, is not as desirable as a surface having longer smoothly curved projections.

A projection from the surface useful in this invention will generally be at least 3 times as long as it is wide at the surface, desirably at least 5 times as long as it is wide, more desirably at least 7 times, preferably at least 10 times, more preferably at least 15 times, and most preferably at least 25 times. Ratios of 100/1 or more may be used, particularly if the projection (e.g., land) is narrow. In FIG. 13, the land width is about 2 millimeters and the land length is about 65 centimeters, giving a ratio of land (projection) length to land (projection) width of over about 300/1. If the land width varies, the average land width should be used to calculate the ratio.

With a disc filter having a stationary flat filter and a closely spaced substantially parallel rotating flat disc (i.e., a disc without grooves, etc.), it is known that the fluid shear is a function of radial position, increasing from a relatively low value at the center to a relatively higher value at the circumference of the disc. Although the entire flat disc rotates as a unit, the tangential linear velocity is essentially zero at the precise center of the disc and is at its maximum at the circumference of the disc. Thus, one would expect the greatest cleaning action or shear caused by rotation of the disc to occur at the annular ring of the filter opposite or corresponding to the circumference of the disc. The fact that with a flat disc the cleaning action or shear at the filter surface varies so widely and depends upon the distance from the center of the filter is a significant disadvantage of using a rotary disc filtration device in which the filtration gap is defined by the filter and by an oppositely disposed flat rotating disc. As shown in the examples below, however, that is in sharp contrast to what is observed when a device of this invention is used.

It is believed that the local cleaning action or shear (and, therefore, the local flux) is proportional to the local groove curvature. For example, generally speaking, curved grooves are more beneficial than straight grooves. It is believed that the local curvature of the grooves can be manipulated to enhance local filtration efficiency. Thus, with this invention a relatively more uniform flux profile may be achieved as compared to a device having a grooveless rotating disc by manipulating the local curvatures of the spiral grooves.

The separation between the two surfaces defining the filtration gap and the speed of rotation also affect the cleaning action or shear and, hence, the flux. The cleaning action, generally speaking, is inversely related to the gap width (indicated by "h" in FIG. 14). As illustrated in Example 3, the effect of varying the gap, at least within a certain range, has a measurable but relatively small effect on flux, that is, the relationship between gap width and wall shear (i.e., shear rate at the membrane surface) is not strong. In any case, at some point, the filtration surface and its oppositely disposed disc will be too far apart for rotation of at least one of the members to have any beneficial effect on flux. On the other hand, because of engineering tolerances, among other things, at some point the two surfaces defining the filtration gap will be too close together to allow rotation of one or the other or both members. Accordingly, there is a useful working range of gap widths for any particular filtration device for a given feed fluid. The two oppositely disposed surfaces defining the fluid filtration gap should be closely spaced and thus the gap width will usually be within the range of 1 to 100 millimeters, often 1 to 50 millimeters, desirably 1 to 25 millimeters, preferably 1 to 15 millimeters, and most preferably 1 to 10 millimeters. Spacings outside the range of 1 to 100 millimeters may be used if the other parameters can be adjusted so that the benefits of this invention are obtained. The gap width for a given device may vary, e.g., in the case where the disc(s) and/or filter(s) are not planar (for example, two conical surfaces that point towards or away from each other). In other words, the fluid filtration gap ("h") can vary radially. Such variation may be useful to help maintain constant average shear stress as feed viscosity increases as a result of concentrating one or more species (e.g., as in dewatering).

The speed of rotation affects the flux: higher rotation rates increase the cleaning action and lower rotation rates decrease the cleaning action. Any speed of rotation may be used that is consistent with the design of the equipment and the shear-sensitivity of the fluid being processed. The speed will usually be from 50 to 2000 rpm, desirably from 100 to 1500 rpm, preferably from 100 to 1200 rpm, and most preferably from 100 to 1100 rpm. Values outside the range of 50 to 2000 rpm may be used provided the benefits of this invention can still be achieved.

Other variables affecting the performance of the device of this invention include the number of spiral grooves on the surface, the size of angles Y and T (FIGS. 1 and 2), the length, width, and depth of the grooves, their cross-sectional shape, the smoothness of the surfaces defining the filtration gap, and the parameters defining fluid rheology, including fluid viscosity, density, whether it contains particles (e.g., cells), and the size, shape, and concentration of those particles.

Figure 15:
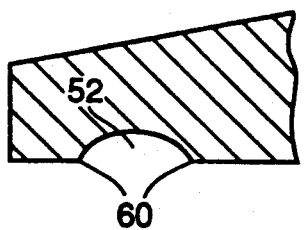
FIGS. 15, 16, 17, and 18 are transverse cross-sectional views of spiral grooves that may be used in this invention.
Figure 16:
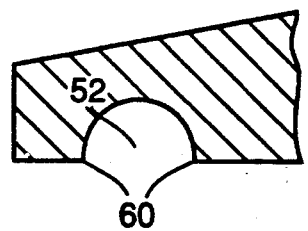
Figure 17:
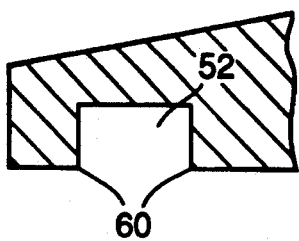
Figure 18:
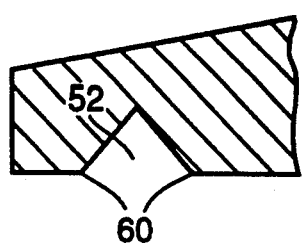

Returning to the accompanying drawings, FIGS. 15 to 18 illustrate grooves 52 having, respectively, elliptical, circular, rectangular (or square), and triangular transverse cross-sections. The cross-sections of FIGS. 15 and 16 are preferred to those of FIGS. 17 and 18 because the inner groove surfaces are continuous curves in FIGS. 15 and 16. The grooves of FIGS. 17 and 18 might have dead or stagnant zones at their inner concave corners.

A number of experiments were run to illustrate some of the benefits of the present invention and the results are shown in FIGS. 19 to 23. Rotary disc filtration devices according to the present invention were compared to rotary filtration devices using discs outside the scope of the present invention and also to cylindrical rotary filtration devices. The cylindrical rotary filtration devices used are commercial-type devices marketed by Membrex, Inc. under the trademarks BENCHMARK and PACESETTER.

In the BENCHMARK device an inner cylinder carrying a membrane having a surface area of approximately 200 square centimeters rotates within a closely spaced outer cylinder. The width of the annular gap is 2 millimeters. The PACESETTER rotary filtration device also has an inner cylinder that rotates within a stationary outer cylinder. The width of the annular gap is approximately 4 millimeters and the membrane filter (area of approximately 2,500 square centimeters) is mounted on the inner wall of the outer cylinder only.

For most of the experiments in which a rotary disc filtration device according to this invention was used, the device shown in FIG. 12 was employed. The spiral grooved rotating disc employed was of the design shown in FIG. 13, and its outer diameter was approximately 28 centimeters. The central cut-out (corresponding to the imaginary circle of radius Ri) on the disc had a diameter of approximately 5 centimeters. The grooves made about 1.2 rotations around the center of the disc (i.e., Y=436°) and were about 9–10 millimeters wide and 4–5 millimeters deep. The inner diameter of the plenum was about 33 centimeters. The distance from the inside of the top of the plenum to the top of the flat filter was about 5 centimeters and the thickness of the disc ranged from about 1 to 3 centimeters. The drive shaft connected to the disc was rotated by a one-horsepower motor coupled through pulleys and a transmission belt.

Figure 20:
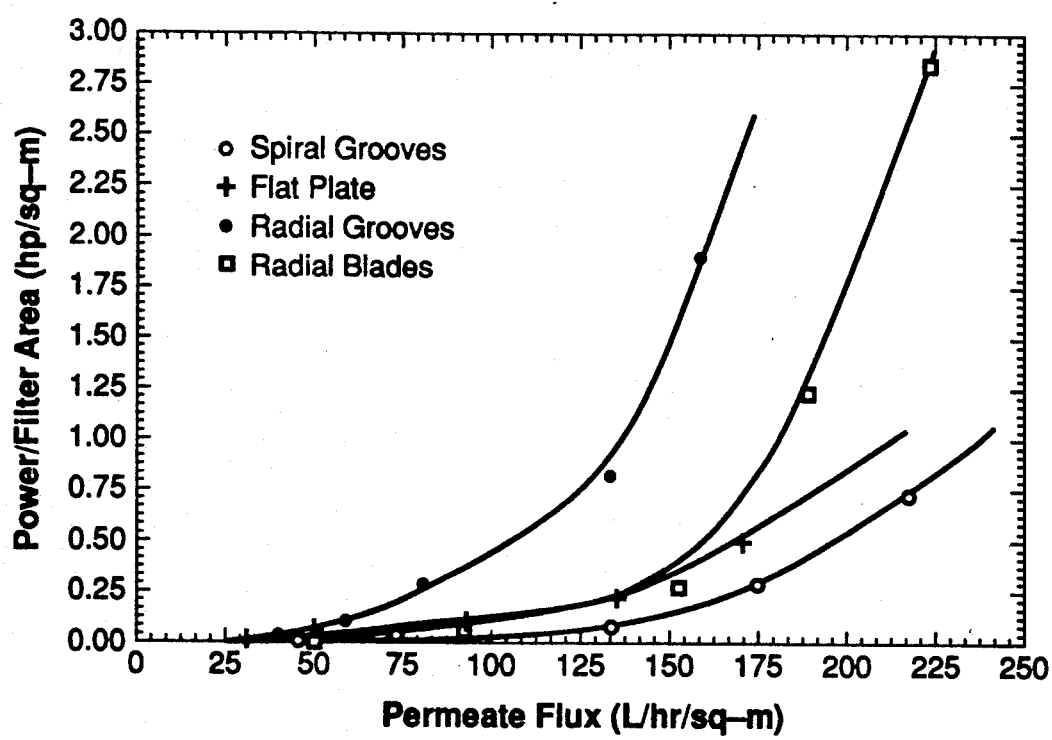
FIG. 20 is a plot of power per unit filter area versus filter permeate flux for rotary disc filtration devices having four different types of disc surfaces oppositely disposed from the filter, the curve for "spiral grooves" being for a device according to the present invention.
Figure 21:
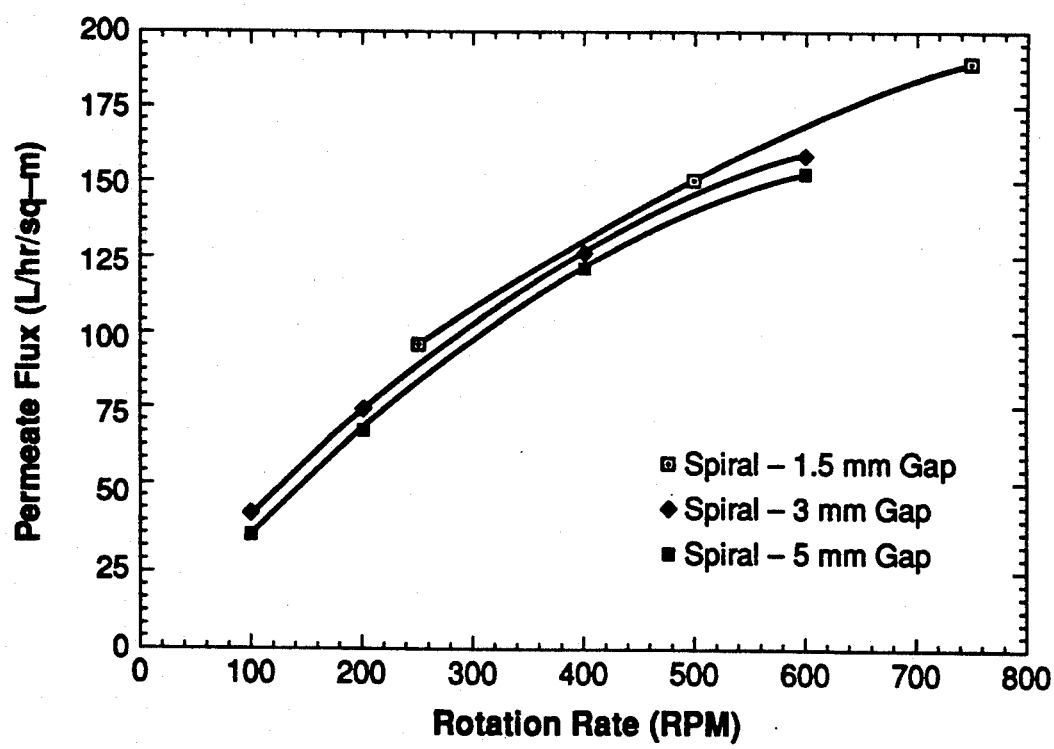
FIG. 21 is a plot of filter permeate flux versus disc rotation rate for a rotary disc filtration device according to the present invention for three different filtration gap widths.
Figure 22:
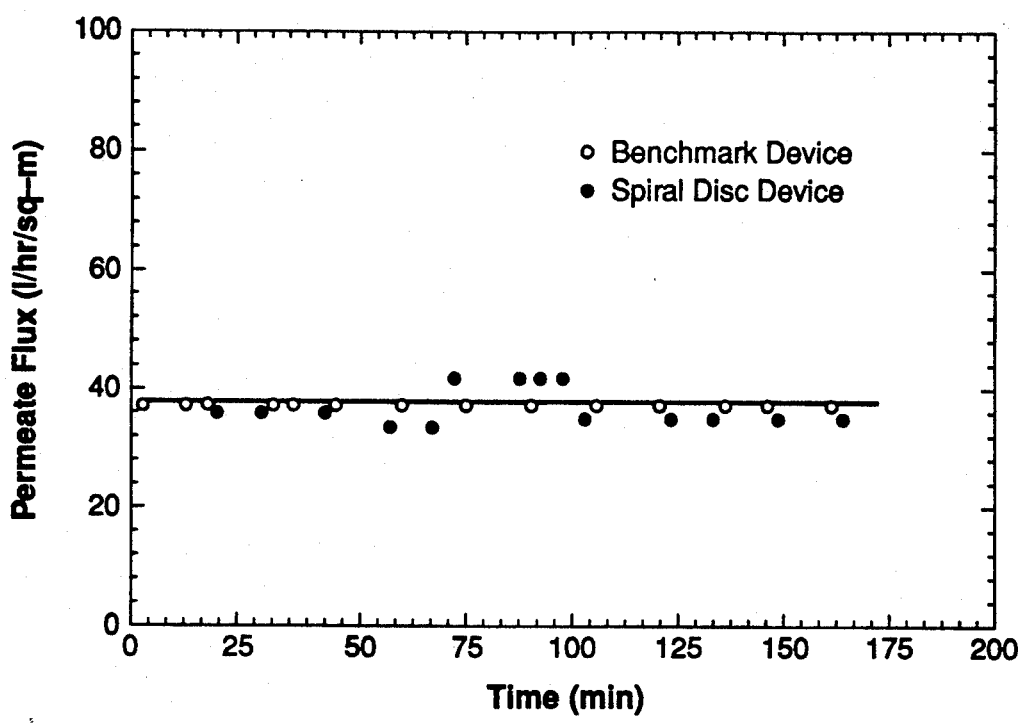
FIG. 22 is a plot of filter permeate flux as a function of time for a rotary cylindrical filtration device and for a rotary disc filtration device according to the present invention.
Figure 23:
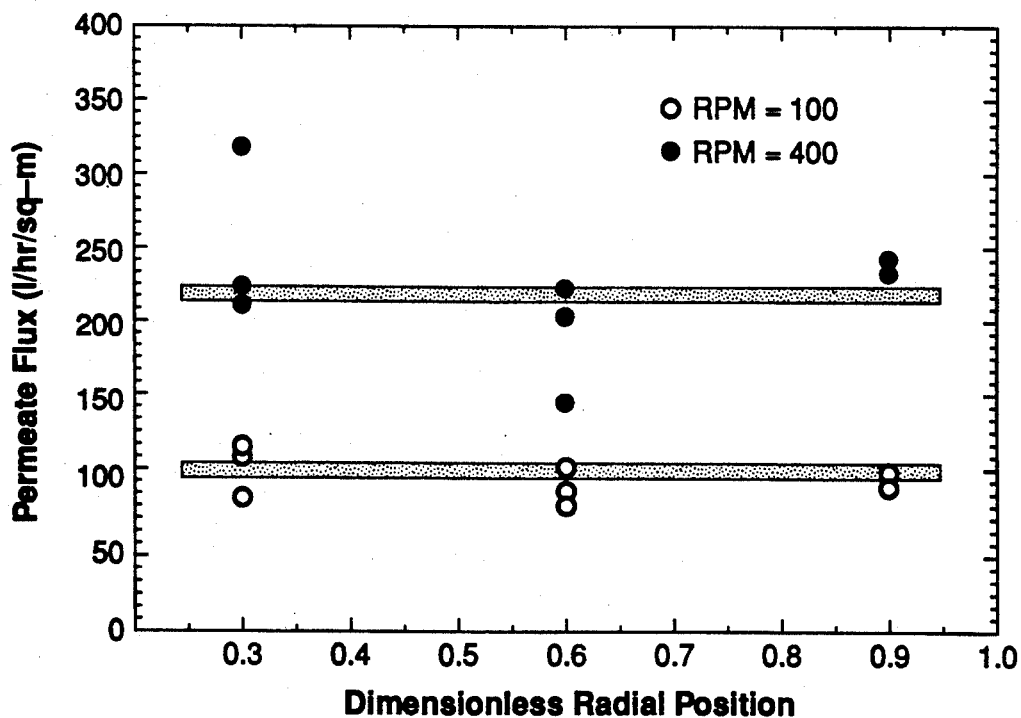
FIG. 23 is a plot of filter permeate flux versus radial position for a rotary disc filtration device according to the present invention for two different disc rotation rates

For the experiment whose results are reported in FIG. 20, a device essentially the same as in FIG. 12 but oriented upside down with respect to FIG. 1 was used. Thus, in that upside down device, the filter support was above the flat filter, which was above the filtration gap, which was above the disc. In the upside down device, the position of the screws holding the disc to the extensions of the drive shaft was changed so that those screws could be removed through the disc (rather than through shaft extensions or wings 68) to simplify changing discs.

Regardless of which device or disc was used, all of the experimental points were determined at steady state, that is, the feed fluid was fed to the device, retentate and permeate were withdrawn from the device, and the retentate and permeate were combined and recycled to the device as feed. Achieving steady state required from about 15 to 30 minutes for each data point.

EXAMPLE 1

In this example, the device of FIGS. 12 and 13 was compared to the BENCHMARK and PACESETTER rotating cylindrical devices described above. For all three devices, the filter used was the ULTRAFILIC MX-50 membrane, within the scope of U.S. Pat. No. 4,906,379, marketed by MEMBREX, INC. That membrane has a 50,000 molecular weight cut-off. The filter surface opposite the rotating disc of FIG. 13 had an area of approximately 600 square centimeters and the width of the fluid filtration gap was 5 millimeters. The disc was rotated at speeds ranging from 100 to 800 rpm, the rotor of the BENCHMARK device was rotated at speeds ranging from about 250 to 4000 rpm, and the rotor of the PACESETTER device was rotated at speeds ranging from about 200 to 2000 rpm. The recirculation scheme described above was used in all three cases to reach steady state.

The aqueous feed filtration solution contained 10 grams per liter of bovine serum albumin (BSA), 0.15 M sodium chloride, and 0.01 M trihydroxy-methylamino methane (TRIS), pH 7. After reaching steady state, the permeate flux and net electrical power (total power minus power losses to belt, pulley, bearings, etc.) for rotating the cylinder or disc for filtration were determined.

Figure 19:
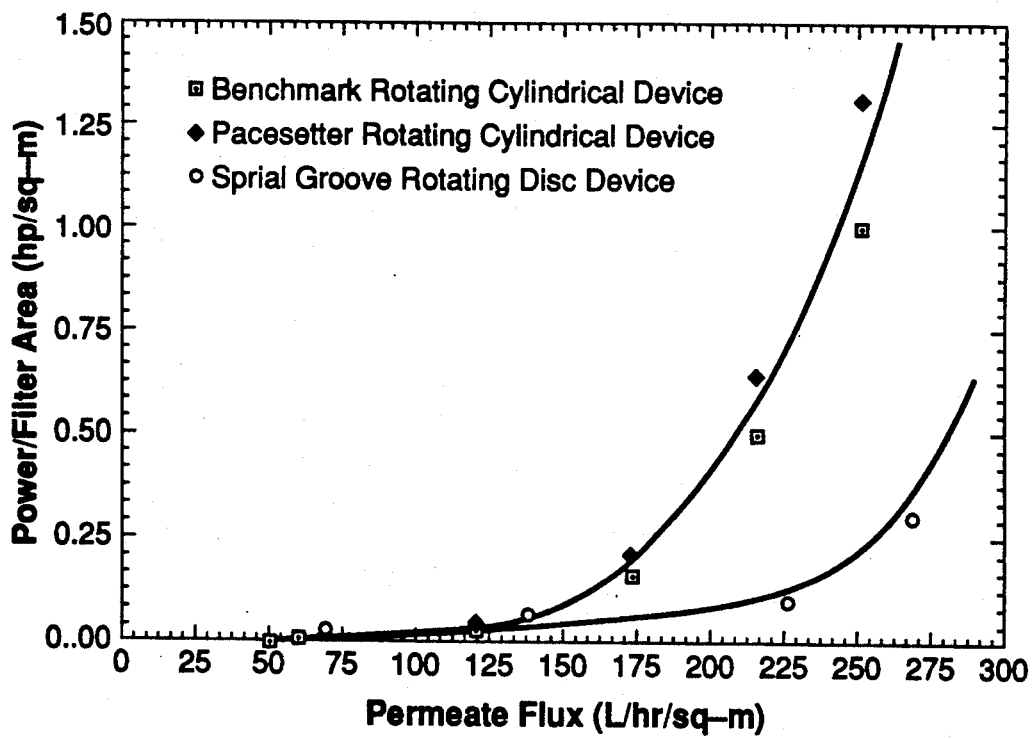
FIG. 19 is a plot of power per unit filter area versus filter permeate flux for two rotary cylindrical filtration devices and for a rotary disc filtration device according to the present invention.

The results are reported in FIG. 19. The ordinate shows the net power per unit filter area (horsepower per square meter) and the abscissa shows the corresponding permeate flux in units of liters of permeate per hour per square meter of filter surface area. Even though the PACESETTER device has a filter area approximately 12.5 times the filter area of the BENCHMARK device, the data points for those two devices lie on essentially the same curve.

The results for the device of this invention fall on a separate curve, located to the right of the curve for the cylindrical rotating devices. Thus, it was found that for a given amount of power per unit filter area, the permeate flux achievable with a device of the present invention was significantly higher than the flux achievable with the cylindrical devices. For example, at 0.5 horsepower per square meter of filter surface area, the permeate flux achievable in the present invention was approximately 35% greater than the flux achievable in the cylindrical rotating devices. Most surprisingly, that result is contrary to the data reported in Wronski, Molga, and Rudniak, "Dynamic Filtration In Biotechnology," Bioprocess Engineering, volume 4, pages 99–104 (1989), which show that the flux is higher in a rotary cylindrical filtration device than in a rotary disc device having a stationary disc filter and a rotating disc impeller. The present contrary and surprising result may be explained by the fact that Wronski et al. did not use a disc with one or more spiral grooves, i.e., they did not use a disc according to the present invention.

EXAMPLE 2

In this example four runs were made with four different discs in the rotary filtration disc device of FIG. 12 and the results further illustrate the unexpected advantages of the present invention. The four discs employed were (1) the spiral grooved disc of FIG. 13, which has been previously described, (2) a flat plate or disc, (3) a flat plate with eight straight radial groove extending from the inner central cut-out (Ri) to the outer periphery (Ro) of the disc, and (4) a flat disc with eight radial blades extending from the inner central cut-out to the outer periphery of the disc. The blades on the radial blade disc were approximately 110 millimeters long, 3 millimeters wide, and 5 millimeters high. The grooves on the radial grooved disc were approximately 110 millimeters long, 10 millimeters wide, and 5 millimeters deep. The same filtration gap width (5 millimeters) and feed solution were used in all cases. The aqueous feed solution contained 5 grams/liter of gamma-globulin, 0.15 M sodium chloride, and 0.01 M phosphate buffer, pH 7. The membrane used in all four cases was the ULTRAFILIC MX-50 membrane filter.

The data points for the four different discs are plotted in FIG. 20. The leftmost curve is for the disc having the eight straight radial grooves. The knee of the curve (at a permeate flux of approximately 125 liters per hour per square meter of filter area) indicates the approximate point at which turbulence began. The sharp upward turn of the curve indicates that substantial increases in energy input to the filtration device produced relatively smaller increases in flux than for points to the left of the knee of the curve. The extra energy not being used to clean the filter, and thereby increase the flux, was being dissipated in turbulent flow.

The curve for the rotary disc device when using a disc having radial blades is displaced to the right of the first curve but has essentially the same shape. The knee has been moved to a flux of approximately 160 liters per hour per square meter, which knee indicates the approximate onset of turbulence.

The curve for the device when using the flat disc coincides with the curve for the device when using a disc with radial blades up through permeate fluxes of approximately 150 liters per hour per square meter. Above that flux value, the curve for the flat plate does not climb as quickly as the curve for the radial blade disc. That indicates the flat disc up through fluxes of approximately 150 1/hr/m$^2$ has the same energy efficiency as the radial blade disc but that at fluxes above that value the flat plate is more efficient.

Most surprisingly, the curve for the device according to the present invention (with the disc having spiral grooves) is more energy efficient and delays the onset of turbulence longer than any of the three preceding systems. For example, at power inputs of 0.5 horsepower per square meter of filter area, the permeate flux with the radial grooved disc is approximately 100 liters per hour per square meter, 155 1/hr/m$^2$ for the radial bladed disc, 160 1/hr/m$^2$ or so for the flat disc, and about 190 1/hr/m$^2$ for the disc of this invention. In other words, at that power level, changing the grooves from radial to spiral almost doubled the flux and changing from a radial blade disc or a flat disc to a spiral groove disc increased the flux by about 20%.

These results show that the device of this invention is substantially more efficient than the other designs tested. These results also show that the spiral groove pattern on the disc suppresses the onset of turbulence as the rotation rate increases. That allows for better control of a filtration device according to this invention and allows substantially higher fluxes to be achieved for a given volume of equipment.

These results and advantages are most unexpected in view of Watabe, "Experiments On The Fluid Friction Of A Rotating Disc With Blades," *Bulletin of JSME*, Volume 5, number 17, pages 49–57 (1962), Who reported that the shapes of blades, whether straight or a 45 degree logarithmic spiral, have little influence on the coefficient of friction. If those coefficients of friction are not significantly different, one would not expect the spiral design used herein to significantly affect, much less delay, the onset of turbulence. Furthermore, Watabe also reported that eight radial blades was optimal, that small increases in the number of radial blades beyond eight had little beneficial effect, but that significantly more than eight reversed the beneficial effect and caused the disc to behave as if it were flat. Therefore, it is surprising that in the present invention a disc having spiral grooves covering almost all of the disc face (90%) did not behave as a flat plate and in fact performed significantly better than a flat plate.

The results and advantages are also most unexpected in view of Murkes and Carlsson, *Crossflow Filtration*, John Wiley & Sons, Ltd. (1988), who report at page 95 that they tested a variety of impellers next to a stationary filtration surface, including a flat disc impeller, a single cross, a double cross, a spoke wheel, a disc with a multitude of randomly drilled holes, and discs with and without radial blades, and that other than discs having eight blades being better than discs having two or four blades, "the difference in efficiency of the different geometries investigated was not very important." Moreover, Murkes and Carlsson also said at page 95 that "no disc geometry has the same dramatic impact on the flux increase as the rotor speed." However, FIG. 20 shows that at a net power consumption of, for example, 0.25 hp/m$^2$, the flux can be more than doubled by changing the disc from radial grooves to spiral grooves whereas the power input has to be increased by approximately a factor of 10 (to about 2.5 hp/m ) with radial grooves (with resulting increase in rotor speed) to achieve the same improvement in flux. This is most unexpected and contrary to Murkes and Carlsson's teaching.

EXAMPLE 3

The three runs of this example were made to determine the effect on permeate flux of varying the width of the fluid filtration gap ("h" in FIG. 14) for different rates of rotation. The results are reported in FIG. 21. The rotary disc filtration device of FIGS. 12 and 13, the gamma-globulin aqueous solution of Example 2, and the ULTRAFILIC MX-50 membrane filter were used. The results show that decreasing the width of the fluid filtration gap from 5 millimeters to 3 millimeters to 1.5 millimeters has a small but noticeable effect on the permeate flux in the range of rotation rates tested (100 rpm up to approximately 750 rpm). It is preferred that the magnitude of the width of the fluid filtration gap (that is, the clearance) be less than or on the same order of magnitude as the depth and width of the spiral groove to achieve the benefits of the present invention. The grooves of the disc of FIG. 13 are about 9–10 millimeters wide and about 4–5 millimeters in depth. Thus, the gap widths used in this example (1.5 to 5 millimeters) are within the class of preferred gap widths for that disc.

EXAMPLE 4

In this example, orange juice was filtered using the BENCHMARK cylindrical rotary filtration device described above and the spiral disc device of FIGS. 12 and 13. A 0.45-micron ULTRAFILIC membrane microfilter within the scope of U.S. Pat. No. 4,906,379 was used in both systems. The rate of permeate withdrawal for each of the devices was adjusted to give substantially the same flux of approximately 37 liters per hour per square meter. The experiments were run to determine if the flux could be maintained in a rotary disc filtration device by means of this invention to the same extent that the flux is maintained by means of the Taylor vortices in a rotary cylindrical filtration device. Results are reported in FIG. 22.

As can be seen, the flux for the BENCHMARK rotary cylindrical device remained constant over a period of more than 2.5 hours of continuous operation. For the spiral disc device of this invention, the flux, which initially was virtually identical to that of the cylindrical device, was increased in an attempt to maximize it after approximately one hour. At approximately the 100-minute mark, it was noticed that the permeate withdrawal pump was starting to cavitate, suggesting that the optimal flux had been surpassed. To halt cavitation the rate of permeate withdrawal was reduced, thereby reducing the flux to approximately 36 l/hr/m$^2$, at which level it remained constant throughout the rest of the run.

The results show that the rotary disc filtration device of this invention can provide the same high steady flux that is provided by a rotary cylindrical filtration device that use Taylor flow. That is surprising in view of the data reported in Wronski, Molga, and Rudniak, "Dynamic Filtration in Biotechnology," *Bioprocess Engineering*, volume 4, pages 99–104 (1989), indicating that cylindrical rotary filtration devices have higher fluxes than rotary disc devices.

EXAMPLE 5

The runs of this example were made to determine the flux as a function of radial position (that is, distance from the center or axis of rotation) for a device of this invention. The rotary disc device of FIGS. 12 and 13 and the BSA aqueous solution described above were used. An ULTRAFILIC MX-50 membrane was used. The flux at each radial position of interest was determined by masking that part of the filter surface not at that radial position. To do this, the annular region of interest wa isolated by masking the remaining membrane area with an impermeable epoxy coating. That prevented permeate from flowing through the filtration surface at radial positions other than the one of interest. Radial positions for R/Ro equal to 0.3, 0.6, and 0.9 and disc rotation rates of 100 and 400 rpm were tested. The results are reported in FIG. 23.

Most surprisingly, at 100 rpm, the permeate flux was essentially constant across the membrane filter surface. The same was also substantially true for the higher rotation rate of 400 rpm, although the absolute value of the flux was approximately 225 liters per hour per square meter at 400 rpm and 100 liters per hour per square meter at 100 rpm. This finding (that the flux does not vary with radial position at a constant disc rotation rate) is most unexpected, particularly in view of the fact that for a flat rotating disc, the flux is known to be highly dependent on radial position, the flux near the center of the disc being low and the flux at the periphery of the disc being significantly higher. As discussed above, it is believed that use of spiral grooves, particularly spirals of higher degrees of curvature, compensates for the lower tangential linear velocity closer to the axis of rotation.

Figure 24:
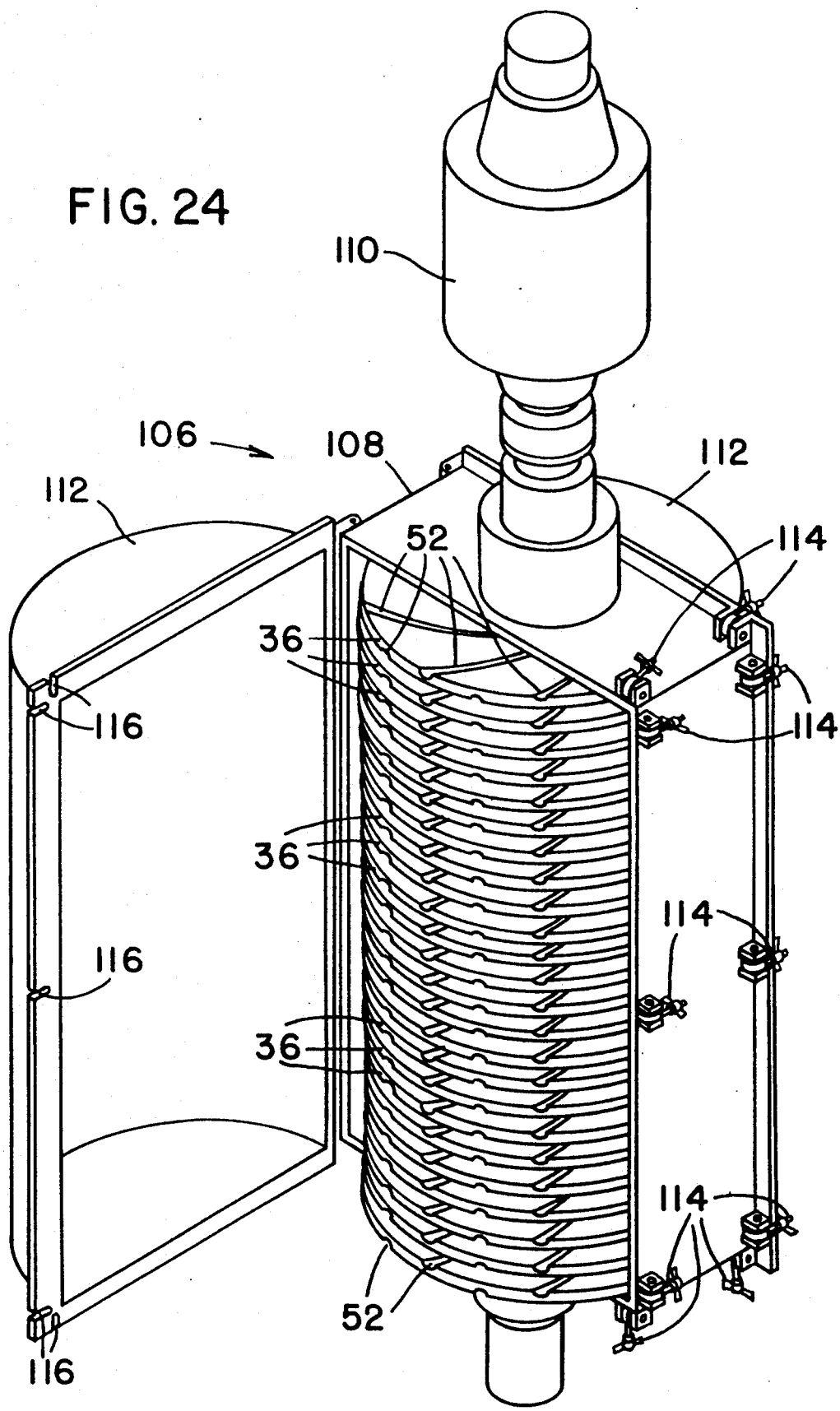
FIG. 24 is a perspective view of a preferred rotary disc filtration device according to the present invention in which a plurality of discs is used and each disc has a plurality of spiral grooves on each of its two major oppositely disposed substantially parallel faces.
Figure 25:
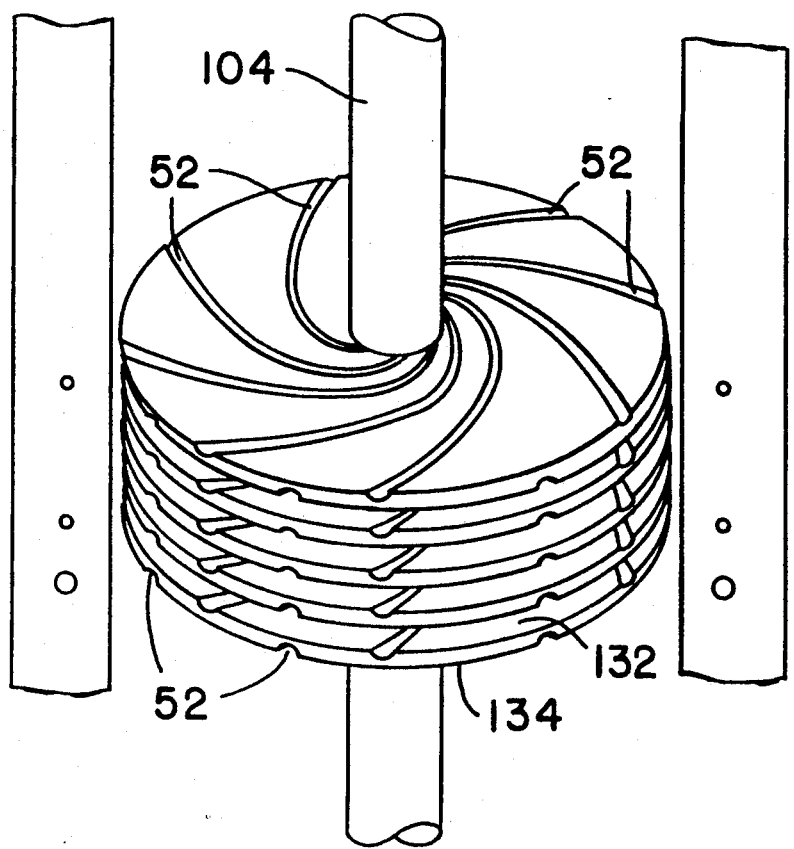
FIG. 25 is a partial perspective view of the rotatable shaft of the device of FIG. 24 showing several of the discs fixedly mounted thereon for rotation in unison.

Turning now to an embodiment with a plurality of discs and filters, in FIGS. 24 and 25, device 106 has numerous discs 36 mounted on shaft 104 for rotation in unison. The discs have grooves 52 on both major oppositely disposed surfaces. Shaft 104 is driven by motor 110 and is rotatably mounted in housing 108. Housing doors 112 are rotatably mounted for access to the grooved discs and to allow removal of cassette 12 of filter assemblies 140, which are semi-circular (see FIG. 26). Doors 112 are held shut during operation by bolts and wing nuts 114, which interact with notches 116 on the housing doors.

Figure 26:
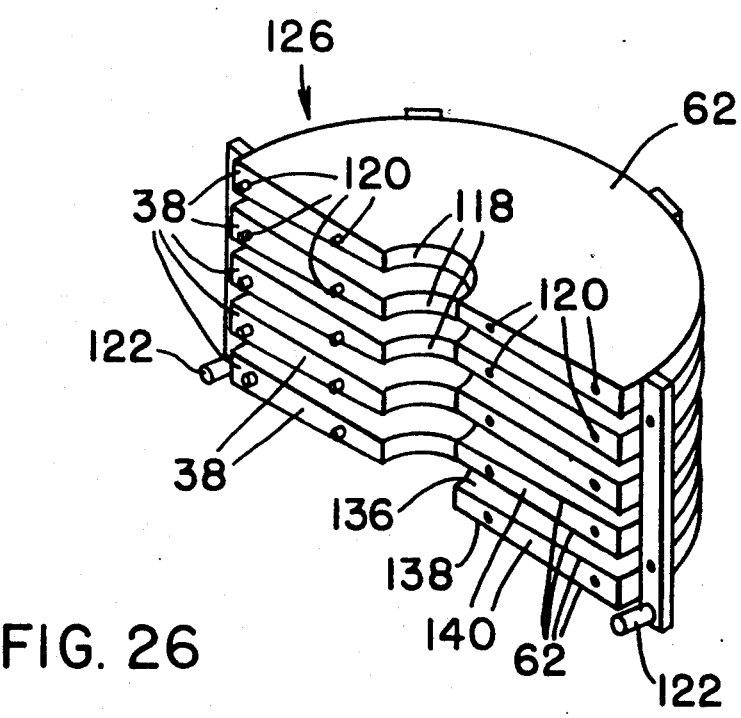
FIG. 26 is a perspective view of a filter assembly cassette comprising five filter assemblies, each filter assembly having a filter surface on each of its two major faces, the cassette being designed to be placed into the device of FIG. 24 so that the rotary discs and stationary filter assemblies are interleaved to provide a plurality of filtration gaps.

FIG. 26 shows cassette 126 of filter assemblies 140 mounted together and fluidly connected for permeate collection. Cassette 126 and a corresponding mating cassette (not shown) are placed into device 106 while housing doors 112 are open. Semi-circular cut-outs 118 on cassette 126 and on its mating cassette (not shown) when placed in device 106 create a passageway for centrally located shaft 104.

Cassette 126 comprises five filter assemblies 140, each filter assembly comprising filter support 38 having a filtration surface 62 on each of its two major oppositely disposed faces. Thus, each of the five filter supports 38 has a first surface 136 and a second surface 138, each of which is a filtration surface. Fluid passing through any of the ten filtration surfaces 62 flows into one of the five filter supports 38. Permeate collection ports 120 fluidly connect cassette 126 and its mating cassette when both are placed in device 106 on opposite sides of shaft 140 so that permeate can be collected. Permeate collection tubes 122 allow permeate to flow from cassette to cassette for collection and withdrawal from device 106.

When cassette 126 and its mating filter cassette (not shown) are placed into device 106, surfaces 136 and 138 lie between the oppositely disposed faces of two adjacent spiral grooved discs. As shown in FIG. 25, each grooved disc has first surface (major face) 132 and second surface (major face) 134. When the filter cassettes are placed into device 106, each disc 36 has its two major faces 132 and 134 located between the oppositely disposed major faces of two adjacent filter assemblies 140.

Figure 27:
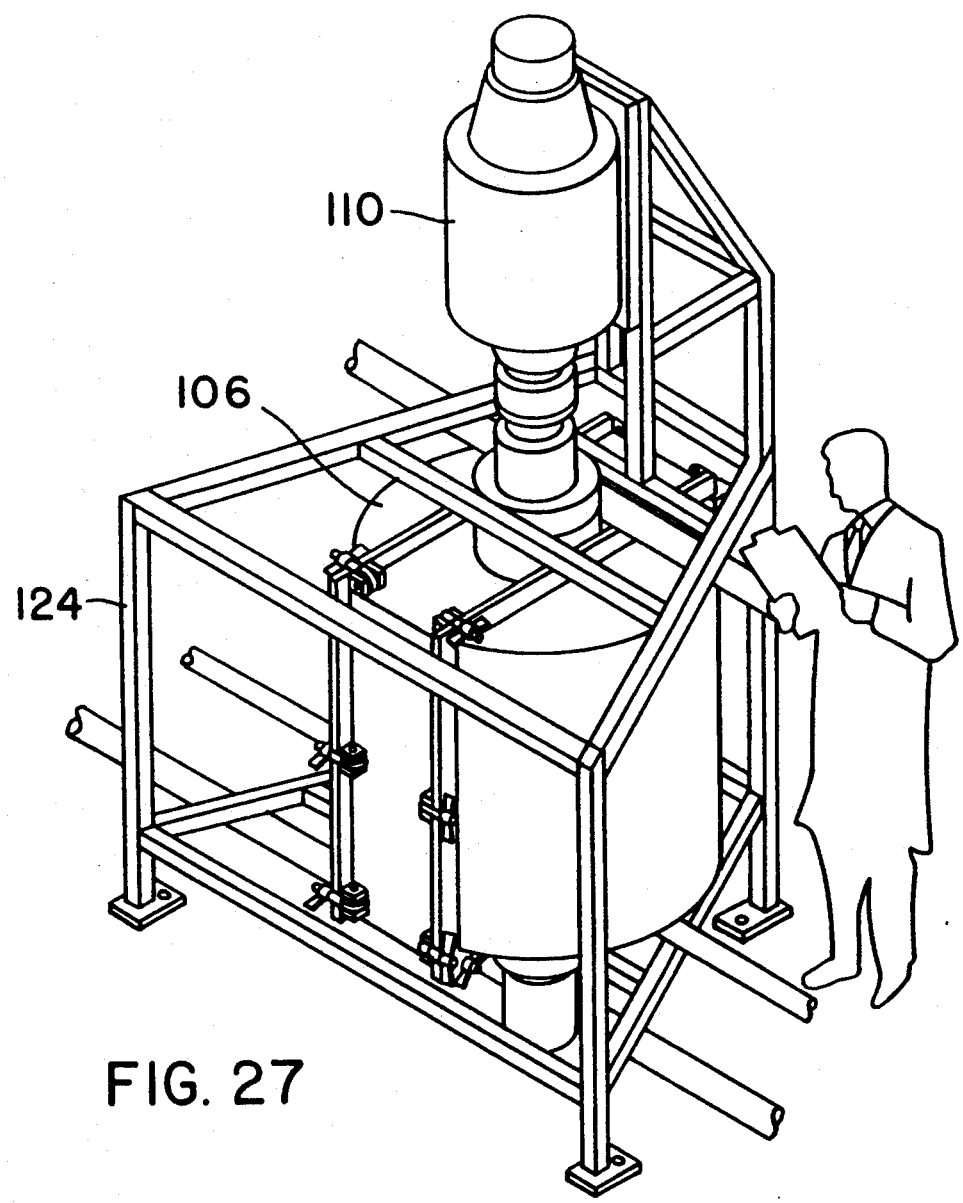
FIG. 27 is a perspective view of the device of FIG. 24 in a support framework.

FIG. 27 shows device 106 with motor 110 mounted in support framework 124.

Figure 28:
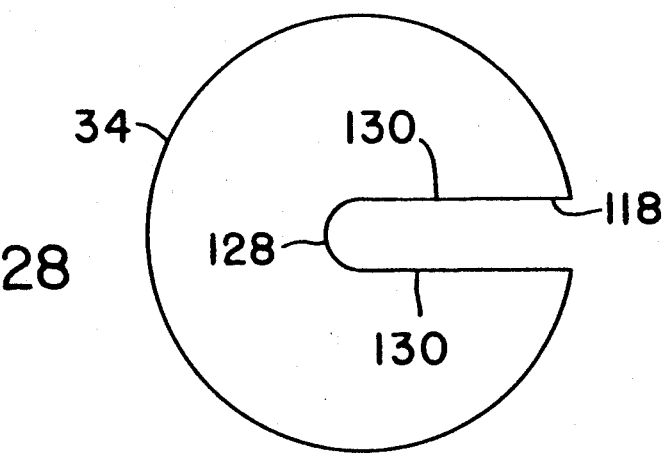
FIG. 28 is a plan view of a filter that may be used in a device of the type shown in FIG. 24.

FIG. 28 shows an alternative design for a filter assembly to be used in device 106. Instead of using two semi-circular cassettes of the type shown in FIG. 26, which have cut-outs 118 to accommodate vertical shaft 104, the filter assembly shown in FIG. 28 may be used. Cut-out 118 of FIG. 28 comprises two oppositely disposed straight portions 13 and curved portion 128. This U-shaped cut-out 118 allows each filter assembly to be unitary (rather than in two sections as with FIG. 26) and to be placed into device 106 through just one of the doors 112. A disadvantage of this filter assembly as compared to the semi-circular design of FIG. 26 is that some filtration area is lost because the cut-out for the shaft in FIG. 28 must extend from the periphery of the filter to the center at reference numeral 128 (FIG. 28).

As used in the claims, the term "oppositely disposed" means that, for example, two surfaces are on opposite sides of the same element, for example, the two major faces of a sheet of paper are oppositely disposed, or that two elements face one another across some gap or boundary, for example, the surface fluid filtration gap (that is, defining a fluid filtration gap) are oppositely disposed. The term "substantially parallel" means that the two lines or planes or elements that are "substantially parallel" do not form an angle with each other greater than about 30°("substantially parallel" was further defined above). "Closely spaced" means that two lines or planes or elements are not so far apart that they can not interact or work together to perform a desired function. Thus, in the case of the facing surfaces of the disc and the filter, "closely spaced" usually means that those surfaces are not more than about 100 millimeters apart, and in that context, "closely spaced" is further de/fined above.

In determining what fraction of the area of a surface is covered by grooves, a plan view of the surface is used, that is, the two-dimensional representation (as on a piece of paper) is used to calculate this fraction. Accordingly, even though a groove 10 millimeters wide, 100 millimeters long, and having a semi-circular cross-section with a maximum depth of 5 millimeters has more than 1000 square millimeters of internal surface area, the area of the groove is taken to be exactly 1000 square millimeters (10 millimeters width multiplied by 100 millimeters length) and does not take into account the increased surface area due to the depth of the groove. Accordingly, it is relatively easy to determine what percentage of a surface is covered by grooves because the fact that the grooves have depth is ignored.

Variations and modifications will be apparent to those skilled in the art and the claims are intended to cover all variations and modifications that fall within the true spirit and scope of the invention.

I claim:

1. A rotary disc filtration device for filtering fluid to produce permeate and retentate, said device comprising:
   (a) a fluid filtration gap for holding fluid to be filtered, said gap being defined by two oppositely disposed substantially parallel closely spaced facing surfaces, one surface defining the gap being the first surface of a first filter through which the permeate passes from the gap and the other surface defining the gap being the surface of a disc, the surface of the disc or the surface of the filter having at least one spiral groove in fluid communication with the fluid when fluid is in the gap, the spiral groove subtending an angle Y in polar coordinates of at least ten degrees on the disc surface or filter surface;
   (b) means for introducing fluid into the fluid filtration gap; and
   (c) means to rotate the disc or the filter to produce permeate.

2. The device of claim 1 wherein the disc surface is also a filter surface.

3. The device of claim 1 wherein the disc surface has at least one spiral groove in fluid communication with the fluid when fluid is in the gap.

4. The device of claim 1 comprising a plurality of discs and/or a plurality of filters in interleaved relationship to define a plurality of fluid filtration gaps, each gap being defined by a disc and its proximate filter surface, at least one surface defining each fluid filtration gap having at least one spiral groove in fluid communication with the fluid when fluid is in that gap, the at least one groove subtending an angle Y in polar coordinates of at least ten degrees.

5. The device of claim 4 wherein the rotation means rotates all the discs or all the filters in unison and both surfaces defining each gap have at least one spiral groove.

6. The device of claim 1 further comprising means to move the rotating disc or filter alternatingly in its direction of rotation between a first direction and a second direction opposite the first.

7. The device of claim 1 further comprising means to move the rotating or non-rotating disc or filter alternatingly between (i) a first direction perpendicular to the direction of rotation of the rotating disc or filter and (ii) a second direction opposite the first direction.

8. The device of claim 1 further comprising means to vibrate the rotating or non-rotating disc or filter.

9. The device of claim 1 further comprising means for testing the permeate or retentate for a physical and/or chemical property and/or for the presence and/or concentration of one or more species.

10. The device of claim 1 further comprising means for imposing an electric field on the fluid being filtered during filtration.

11. The device of claim 1 further comprising means for controlling the transmembrane pressure differential on the filter.

12. The device of claim 1 wherein the filter is such that a drop of permeate on the filter surface has a contact angle of not more than 30 degrees.

13. The device of claim 1 wherein the fluid filtration gap width varies radially.

14. The device of claim 1 wherein the filter comprises a matrix containing molecules of a nitrile-containing polymer having reactive pendent groups that provides solely on the surface of the matrix sufficient uncharged, hydrophilic polar groups to render the surface hydrophilic, the polar groups having been obtained by derivatization of the reactive pendent groups of the polymer.

15. The device of claims 1 wherein the filter has selective sorption ligands attached to it.

16. The device of claim 1 wherein oppositely disposed filter and disc surfaces are spaced apart not more than 100 millimeters and are at an angle to each other not greater than 30 degrees, and the ratio of the average width of at least one spiral groove to its average depth is in the range of 4/1 to ¼.

17. The device of claim 1 wherein the filter is an asymmetric surface filter.

18. The device of any one of claims 1 to 17 wherein the disc has at least one spiral groove.

19. The device of claim 1 wherein angle Y is greater than forty-five degrees.

20. The device of claim 19 wherein the disc has at least one spiral groove.

21. The device of claim 1 wherein angle Y is at least ninety degrees.

22. The device of claim 21 wherein the disc has at least one spiral groove.

23. A rotary disc filtration device for filtering fluid to produce permeate and retentate, said device comprising:

(a) a fluid filtration gap for holding fluid to be filtered, said gap being defined by two oppositely disposed substantially parallel closely spaced facing surfaces, one surface defining the gap being the first surface of a first filter through which the permeate passes from the gap and the other surface defining the gap being the surface of a disc, the surface of the disc having at least one spiral groove in fluid communication with the fluid when fluid is in the gap, the spiral groove subtending an angle Y in polar coordinates of greater than forty-five degrees on the disc surface area that is oppositely disposed to the first surface of the first filter through which the permeate passes;

(b) means for introducing fluid into the fluid filtration gap; and (c) means to rotate the disc or the filter to produce permeate.

24. The device of claim 23 wherein the disc surface is also a filter surface.

25. The device of claim 23 wherein the first filter surface of the first filter also has one or more spiral grooves in fluid communication with the fluid when fluid is in the gap.

26. The device of claim 23 comprising a plurality of discs and/or a plurality of filters in interleaved relationship to define a plurality of fluid filtration gaps, each gap being defined by a disc and its proximate filter surface, at least one surface of each disc having at least one spiral groove in fluid communication with the fluid when fluid is in the respective gap, at least one groove on each disc subtending an angle Y in polar coordinates of greater than forty-five degrees on the disc area that is oppositely disposed to the surface of each filter through which the permeate passes.

27. The device of claim 26 wherein the rotation means rotates all the discs or all the filters in unison and both surfaces of at least one disc have one or more spiral grooves.

28. The device of claim 23 further comprising means to move the rotating disc or filter alternatingly in its direction of rotation between a first direction and a second direction opposite the first.

29. The device of claim 23 further comprising means to move the rotating or non-rotating disc or filter alternatingly between (i) a first direction perpendicular to the direction of rotation of the rotating disc or filter and (ii) a second direction opposite the first direction.

30. The device of claim 23 further comprising means to vibrate the rotating or non-rotating disc or filter.

31. The device of claim 23 further comprising means for testing the permeate or retentate for its physical and/or chemical properties and/or for the presence and/or concentration of one or more species.

32. The device of claim 23 further comprising means for imposing an electric field on the fluid being filtered during filtration.

33. The device of claim 23 further comprising means for controlling the transmembrane pressure differential on the filter.

34. The device of claim 23 wherein the filter is such that a drop of permeate on the filter surface has a contact angle of not more than 30 degrees.

35. The device of claim 23 wherein the fluid filtration gap width varies radially.

36. The device of claim 23 wherein the filter comprises a matrix containing molecules of a nitrile-containing polymer having reactive pendent groups that provides solely on the surface of the matrix sufficient uncharged, hydrophilic polar groups to render the surface hydrophilic, the polar groups having been obtained by derivatization of the reactive pendent groups of the polymer.

37. The device of claims 23 wherein the filter has selective sorption affinity ligands attached to it.

38. The device of claim 23 wherein oppositely disposed filter and disc surfaces are spaced apart not more than 100 millimeters and are at an angle to each other not greater than 30 degrees, and the ratio of the average width of the at least one spiral groove to its average depth is in the range of 4/1 to ¼.

39. The device of claim 23 wherein the filter is an asymmetric surface filter.

40. The device of any one of claims 23 to 39 wherein angle Y is at least ninety degrees.

41. The device of any one of claims 23 to 39 wherein angle Y is at least one hundred fifty degrees.

42. A rotary disc filtration device for filtering fluid to produce permeate and retentate, said device comprising:
   (a) a fluid filtration gap for holding fluid to be filtered, said gap being defined by two oppositely disposed substantially parallel closely spaced facing surfaces, one surface defining the gap being the surface of a filter through which the permeate passes and the other surface defining the gap being the surface of a disc, the surface of the disc having a spiral groove in fluid communication with the fluid when fluid is in the gap, the groove subtending an angle Y in polar coordinates of greater than forty-five degrees on the disc surface area that is oppositely disposed to the surface of the filter through which the permeate passes, the two oppositely disposed surfaces being spaced apart not more than 50 millimeters and being at an angle to each other not greater than 10°, and the ratio of the average width of the groove to its average depth being in the range of 4/1 to ¼;
   (b) means for introducing fluid into the fluid filtration gap; and
   (c) means to rotate the disc or the filter to produce permeate.

43. The device of claim 42 wherein the disc surface is also a filter surface.

44. The device of claim 42 further comprising means to move the rotating disc or filter alternatingly in its direction of rotation between a first direction and a second direction opposite the first.

45. The device of claim 42 further comprising means to move the rotating or non-rotating disc or filter alternatingly between (i) a first direction perpendicular to the direction of rotation of the rotating disc or filter and (ii) a second direction opposite the first direction.

46. The device of claim 42 further comprising means to vibrate the rotating or non-rotating disc or filter.

47. The device of claim 42 further comprising means for testing the permeate or retentate for a physical and/or chemical property and/or for the presence and/or concentration of one or more species.

48. The device of claim 42 further comprising means for imposing an electric field on the fluid being filtered during filtration.

49. The device of claim 42 further comprising means for controlling the transmembrane pressure differential on the filter.

50. The device of claim 42 wherein the filter is such that a drop of permeate on the filter surface has a contact angle of not more than 30 degrees.

51. The device of claim 42 wherein the fluid filtration gap width varies radially.

52. The device of claim 42 wherein the filter comprises a matrix containing molecules of a nitrile-containing polymer having reactive pendent groups that provides solely on the surface of the matrix sufficient uncharged, hydrophilic polar groups to render the surface hydrophilic, the polar groups having been obtained by derivatization of the reactive pendent groups of the polymer.

53. The device of claims 42 wherein the filter has selective sorption affinity ligands attached to it.

54. The device of claim 42 wherein the filter is an asymmetric surface filter.

55. The device of any of claims 42 to 54 wherein angle Y is at least ninety degrees.

56. The device of any of claims 42 to 54 wherein angle Y is at least on hundred fifty degrees.

57. A process for filtering fluid in a filtration gap using a rotary disc filtration device to produce permeate and retentate, said process comprising:
   (a) providing a rotary disc filtration device comprising:
      (i) a fluid filtration ga for holding fluid to be filtered, said gap being defined by two oppositely disposed substantially parallel closely spaced facing surfaces, one surface defining the gap being the surface of a filter through which the permeate passes from the gap and the other surface defining the gap being the surface of a disc, the surface of the disc or the surface of the filter having at least one spiral groove in fluid communication with the fluid when fluid is in the gap, the spiral groove subtending an angle Y in polar coordinates of at least ten degrees on the disc surface or filter surface;
      (ii) means for introducing fluid into the fluid filtration gap; and
      (iii) means to rotate the disc or the filter;
   (b) introducing fluid into the gap;
   (c) rotating the disc or the filter to produce permeate and retentate.

58. The process of claim 57 wherein angle Y is greater than forty-five degrees and the two oppositely disposed surfaces are spaced apart not more than 100 millimeters and are at an angle to each other of not greater than thirty degrees; and for at least one spiral groove, the ratio of its average width to its average depth is in the range of 4/1 to ¼.

59. The process of claim 57 wherein a species in the feed fluid is concentrated in the retentate by the filtration process.

60. The process of claim 57 further comprising testing the retentate or the permeate for a physical and/or chemical property and/or for the presence and/or concentration of one or more species.

61. The process of claim 57 wherein the fluid is introduced into the fluid filtration gap by at least partially immersing the device in the fluid to be filtered.

62. The process of claim 57 wherein the rotary filtration device has at least one spiral groove on the surface of the disc.

63. The process of claim 62 wherein angle Y of the rotary filtration device is greater than forty-five degrees.

64. The process of claim 63 wherein a species in the feed fluid is concentrated in the retentate by the filtration process.

65. The process of claim 63 further comprising testing the retentate or the permeate for a physical and/or chemical property and/or for the presence and/or concentration of one or more species.

66. The process of claim 63 wherein the fluid is introduced into the fluid filtration gap by at least partially immersing the device in the fluid to be filtered.

67. The process of claims 57 or 63 wherein the fluid to be filtered comprises at least two phases.

68. The process of claims 57 or 63 wherein the fluid to be filtered comprises at least two aqueous phases.

69. The process of claims 57 or 63 wherein the fluid to be filtered comprises aqueous and non-aqueous phases.

70. The process of claims 57 or 63 wherein the fluid to be filtered contains at least one solid phase.

71. The process of claim 70 wherein the solid phase comprises selective sorption affinity particles, ion exchange resin, catalyst particles, adsorbent particles, absorbent particles, and/or inert carrier particles.

72. The process of claims 57 or 63 wherein the fluid contains surfactants, emulsions, and/or liposomes.

73. The process of claims 57 or 63 wherein the fluid to be filtered contains a food oil, crude oil, and/or a petroleum product.

74. The process of claims 57 or 63 wherein the fluid to be filtered contains a drug or precursor thereof.

75. The process of claims 57 or 63 wherein the fluid to be filtered comprises a biological fluid.

76. The process of claim 75 wherein the biological fluid contains genetically engineered material.

77. The process of claim 75 wherein the biological fluid results from a fermentation process.

78. The process of claim 75 wherein the biological fluid contains microorganisms.

79. The process of claim 75 wherein the biological fluid contains material selected from the group consisting of blood, blood serum, plasma, and blood cells.

80. The process of claim 75 wherein the biological fluid contains a plant extract.

81. The process of claim 75 wherein the biological fluid comprises a vegetable or fruit juice.

* * * * *